US012676428B2

(12) United States Patent
Markish et al.

(10) Patent No.: US 12,676,428 B2
(45) Date of Patent: Jul. 7, 2026

(54) APPARATUS, AND SYSTEM OF A POLARIZED ANTENNA

(71) Applicant: MobilEye Vision Technologies Ltd., Jerusalem (IL)

(72) Inventors: Ofer Markish, Ra'anana (IL); Hila Hazenshprung, Tirat Yehuda (IL)

(73) Assignee: MOBILEYE VISION TECHNOLOGIES LTD., Jerusalem (IL)

( * ) Notice: Subject to any disclaimer, the term of this patent is extended or adjusted under 35 U.S.C. 154(b) by 82 days.

(21) Appl. No.: 18/915,171

(22) Filed: Oct. 14, 2024

(65) Prior Publication Data

US 2025/0125539 A1 Apr. 17, 2025

Related U.S. Application Data

(60) Provisional application No. 63/590,576, filed on Oct. 16, 2023.

(51) Int. Cl.

| | |
|---|---|
| ***H01Q 1/32*** | (2006.01) |
| ***H01Q 9/04*** | (2006.01) |
| ***H01Q 21/06*** | (2006.01) |
| ***H01Q 21/24*** | (2006.01) |

(52) U.S. Cl.

CPC ........... *H01Q 21/24* (2013.01); *H01Q 9/0414* (2013.01); *H01Q 21/065* (2013.01)

(58) Field of Classification Search

CPC .... H01Q 21/24; H01Q 9/0414; H01Q 21/065; H01Q 21/0075; H01Q 1/3233

See application file for complete search history.

(56) References Cited

U.S. PATENT DOCUMENTS

| | | | | |
|---|---|---|---|---|
| 12,372,642 | B2 * | 7/2025 | Panzer | H01Q 21/061 |
| 2021/0389453 | A1 * | 12/2021 | Panzer | G01S 13/931 |
| 2022/0163623 | A1 * | 5/2022 | Kishigami | G01S 13/288 |
| 2025/0105518 | A1 * | 3/2025 | Pham | H01Q 1/523 |
| 2025/0123392 | A1 | 4/2025 | Markish | |

* cited by examiner

*Primary Examiner* — David E Lotter
(74) *Attorney, Agent, or Firm* — Shichrur & Co.

(57) ABSTRACT

For example, a polarized antenna may include a dielectric layer including an antenna via; a first metal layer on a first side of the dielectric layer, the first metal layer including an antenna feeding trace connected to a first end of the antenna via; and a second metal layer on a second side of the dielectric layer. For example, the second metal layer may include a plurality of antenna elements including a first antenna element, a second antenna element, and a third antenna element. For example, the third antenna element may be connected to a second end of the antenna via. For example, the second metal layer may include a plurality of antenna traces serially connecting the plurality of antenna elements.

25 Claims, 19 Drawing Sheets

1700

1800

APPARATUS, AND SYSTEM OF A POLARIZED ANTENNA

CROSS REFERENCE

This application claims the benefit of and priority from U.S. Provisional Patent Application No. 63/590,576 entitled "APPARATUS, AND SYSTEM OF A POLARIZED ANTENNA", filed Oct. 16, 2023, the entire disclosure of which is incorporated herein by reference.

BACKGROUND

Various types of devices and systems, for example, autonomous and/or robotic devices, e.g., autonomous vehicles and robots, may be configured to perceive and navigate through their environment using sensor data of one or more sensor types.

Conventionally, autonomous perception relies heavily on light-based sensors, such as image sensors, e.g., cameras, and/or Light Detection and Ranging (LiDAR) sensors. Such light-based sensors may perform poorly under certain conditions, such as, conditions of poor visibility, or in certain inclement weather conditions, e.g., rain, snow, hail, or other forms of precipitation, thereby limiting their usefulness or reliability.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
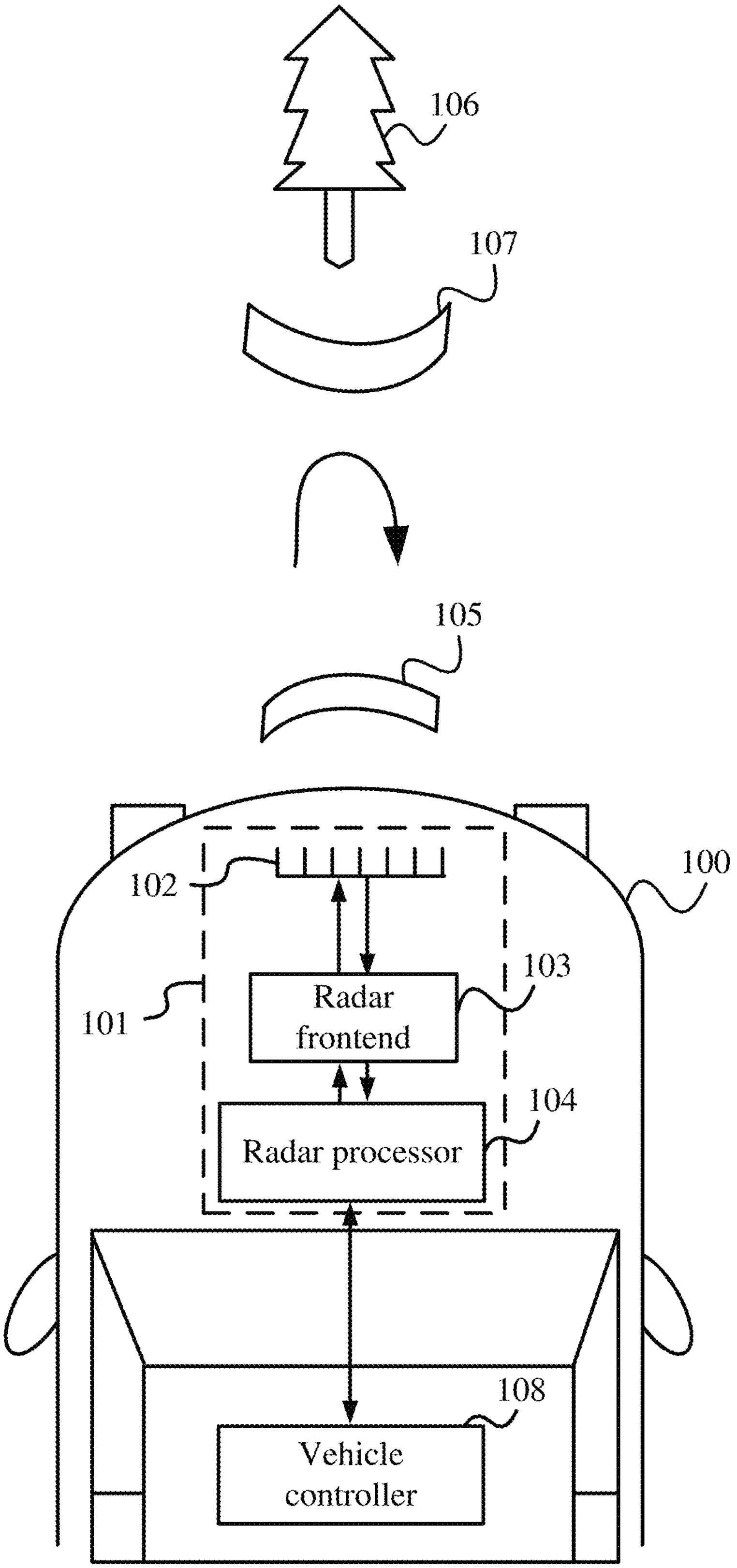
FIG. 1 is a schematic block diagram illustration of a vehicle implementing a radar, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

The words "exemplary" and "demonstrative" are used herein to mean "serving as an example, instance, demonstration, or illustration". Any aspect, aspect, or design described herein as "exemplary" or "demonstrative" is not necessarily to be construed as preferred or advantageous over other aspects, aspects, or designs.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

The phrases "at least one" and "one or more" may be understood to include a numerical quantity greater than or equal to one, e.g., one, two, three, four, [ . . . ], etc. The phrase "at least one of" with regard to a group of elements may be used herein to mean at least one element from the group consisting of the elements. For example, the phrase "at least one of" with regard to a group of elements may be used herein to mean one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and/or may represent any information as understood in the art.

The terms "processor" or "controller" may be understood to include any kind of technological entity that allows handling of any suitable type of data and/or information. The data and/or information may be handled according to one or more specific functions executed by the processor or controller. Further, a processor or a controller may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), and the like, or any combination thereof. Any other kind of implementation of the respective functions, which will be described below in further detail, may also be understood as a processor, controller, or logic circuit. It is understood that any two (or more) processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "memory" is understood as a computer-readable medium (e.g., a non-transitory computer-readable medium) in which data or information can be stored for retrieval. References to "memory" may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" may be used to refer to any type of executable instruction and/or logic, including firmware.

A "vehicle" may be understood to include any type of driven object. By way of example, a vehicle may be a driven object with a combustion engine, an electric engine, a reaction engine, an electrically driven object, a hybrid driven object, or a combination thereof. A vehicle may be, or may include, an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, among others.

A "ground vehicle" may be understood to include any type of vehicle, which is configured to traverse the ground, e.g., on a street, on a road, on a track, on one or more rails, off-road, or the like.

An "autonomous vehicle" may describe a vehicle capable of implementing at least one navigational change without driver input. A navigational change may describe or include a change in one or more of steering, braking, acceleration/deceleration, or any other operation relating to movement, of the vehicle. A vehicle may be described as autonomous even in case the vehicle is not fully autonomous, for example, fully operational with driver or without driver input. Autonomous vehicles may include those vehicles that can operate under driver control during certain time periods, and without driver control during other time periods. Additionally or alternatively, autonomous vehicles may include vehicles that control only some aspects of vehicle navigation, such as steering, e.g., to maintain a vehicle course between vehicle lane constraints, or some steering operations under certain circumstances, e.g., not under all circumstances, but may leave other aspects of vehicle navigation to the driver, e.g., braking or braking under certain circumstances. Additionally or alternatively, autonomous vehicles may include vehicles that share the control of one or more aspects of vehicle navigation under certain circumstances, e.g., hands-on, such as responsive to a driver input; and/or vehicles that control one or more aspects of vehicle navigation under certain circumstances, e.g., hands-off, such as independent of driver input. Additionally or alternatively, autonomous vehicles may include vehicles that control one or more aspects of vehicle navigation under certain circumstances, such as under certain environmental conditions, e.g., spatial areas, roadway conditions, or the like. In some aspects, autonomous vehicles may handle some or all aspects of braking, speed control, velocity control, steering, and/or any other additional operations, of the vehicle. An autonomous vehicle may include those vehicles that can operate without a driver. The level of autonomy of a vehicle may be described or determined by the Society of Automotive Engineers (SAE) level of the vehicle, e.g., as defined by the SAE, for example in *SAE J3016 2018: Taxonomy and definitions for terms related to driving automation systems for on road motor vehicles*, or by other relevant professional organizations. The SAE level may have a value ranging from a minimum level, e.g., level 0 (illustratively, substantially no driving automation), to a maximum level, e.g., level 5 (illustratively, full driving automation).

An "assisted vehicle" may describe a vehicle capable of informing a driver or occupant of the vehicle of sensed data or information derived therefrom.

The phrase "vehicle operation data" may be understood to describe any type of feature related to the operation of a vehicle. By way of example, "vehicle operation data" may describe the status of the vehicle, such as, the type of tires of the vehicle, the type of vehicle, and/or the age of the manufacturing of the vehicle. More generally, "vehicle operation data" may describe or include static features or static vehicle operation data (illustratively, features or data not changing over time). As another example, additionally or alternatively, "vehicle operation data" may describe or include features changing during the operation of the vehicle, for example, environmental conditions, such as weather conditions or road conditions during the operation of the vehicle, fuel levels, fluid levels, operational parameters of the driving source of the vehicle, or the like. More generally, "vehicle operation data" may describe or include varying features or varying vehicle operation data (illustratively, time varying features or data).

Some aspects may be used in conjunction with various devices and systems, for example, a radar sensor, a radar device, a radar system, a vehicle, a vehicular system, an autonomous vehicular system, a vehicular communication system, a vehicular device, an airborne platform, a waterborne platform, road infrastructure, sports-capture infrastructure, city monitoring infrastructure, static infrastructure platforms, indoor platforms, moving platforms, robot platforms, industrial platforms, a sensor device, a User Equipment (UE), a Mobile Device (MD), a wireless station (STA), a sensor device, a non-vehicular device, a mobile or portable device, and the like.

Some aspects may be used in conjunction with Radio Frequency (RF) systems, radar systems, vehicular radar systems, autonomous systems, robotic systems, detection systems, or the like.

Some demonstrative aspects may be used in conjunction with an RF frequency in a frequency band having a starting frequency above 10 Gigahertz (GHz), for example, a frequency band having a starting frequency between 10 GHz and 120 GHz. For example, some demonstrative aspects may be used in conjunction with an RF frequency having a starting frequency above 30 GHz, for example, above 45 GHZ, e.g., above 60 GHz. For example, some demonstrative aspects may be used in conjunction with an automotive radar frequency band, e.g., a frequency band between 76 GHz and 81 GHz. However, other aspects may be implemented utilizing any other suitable frequency bands, for example, a frequency band above 140 GHz, a frequency band of 300 GHz, a sub Terahertz (THz) band, a THz band, an Infra-Red (IR) band, and/or any other frequency band.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, some functions associated with the circuitry may be implemented by one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "communicating" as used herein with respect to a signal includes transmitting the signal and/or receiving the signal. For example, an apparatus, which is capable of communicating a signal, may include a transmitter to transmit the signal, and/or a receiver to receive the signal. The verb communicating may be used to refer to the action of transmitting or the action of receiving. In one example, the phrase "communicating a signal" may refer to the action of transmitting the signal by a transmitter, and may not necessarily include the action of receiving the signal by a receiver. In another example, the phrase "communicating a signal" may refer to the action of receiving the signal by a receiver, and may not necessarily include the action of transmitting the signal by a transmitter.

The term "antenna", as used herein, may include any suitable configuration, structure, and/or arrangement of one or more antenna elements, components, units, assemblies, and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a MIMO (Multiple-Input Multiple-Output) array antenna, a single element antenna, a set of switched beam antennas, and/or the like. In one example, an antenna may be implemented as a separate element or an integrated element, for example, as an on-module antenna, an on-chip antenna, or according to any other antenna architecture.

Some demonstrative aspects are described herein with respect to RF radar signals. However, other aspects may be implemented with respect to, or in conjunction with, any other radar signals, wireless signals, IR signals, acoustic signals, optical signals, wireless communication signals, communication scheme, network, standard, and/or protocol. For example, some demonstrative aspects may be implemented with respect to systems, e.g., Light Detection Ranging (LiDAR) systems, and/or sonar systems, utilizing light and/or acoustic signals.

Reference is now made to FIG. 1, which schematically illustrates a block diagram of a vehicle 100 implementing a radar, in accordance with some demonstrative aspects.

In some demonstrative aspects, vehicle 100 may include a car, a truck, a motorcycle, a bus, a train, an airborne vehicle, a waterborne vehicle, a cart, a golf cart, an electric cart, a road agent, or any other vehicle.

In some demonstrative aspects, vehicle 100 may include a radar device 101, e.g., as described below. For example, radar device 101 may include a radar detecting device, a radar sensing device, a radar sensor, or the like, e.g., as described below.

In some demonstrative aspects, radar device 101 may be implemented as part of a vehicular system, for example, a system to be implemented and/or mounted in vehicle 100.

In one example, radar device 101 may be implemented as part of an autonomous vehicle system, an automated driving system, an assisted vehicle system, a driver assistance and/or support system, and/or the like.

For example, radar device 101 may be installed in vehicle 100 for detection of nearby objects, e.g., for autonomous driving.

In some demonstrative aspects, radar device 101 may be configured to detect targets in a vicinity of vehicle 100, e.g., in a far vicinity and/or a near vicinity, for example, using RF and analog chains, capacitor structures, large spiral transformers and/or any other electronic or electrical elements, e.g., as described below.

In one example, radar device 101 may be mounted onto, placed, e.g., directly, onto, or attached to, vehicle 100.

In some demonstrative aspects, vehicle 100 may include a plurality of radar aspects, vehicle 100 may include a single radar device 101.

In some demonstrative aspects, vehicle 100 may include a plurality of radar devices 101, which may be configured to cover a field of view of 360 degrees around vehicle 100.

In other aspects, vehicle 100 may include any other suitable count, arrangement, and/or configuration of radar devices and/or units, which may be suitable to cover any other field of view, e.g., a field of view of less than 360 degrees.

In some demonstrative aspects, radar device 101 may be implemented as a component in a suite of sensors used for driver assistance and/or autonomous vehicles, for example, due to the ability of radar to operate in nearly all-weather conditions.

In some demonstrative aspects, radar device 101 may be configured to support autonomous vehicle usage, e.g., as described below.

In one example, radar device 101 may determine a class, a location, an orientation, a velocity, an intention, a perceptional understanding of the environment, and/or any other information corresponding to an object in the environment.

In another example, radar device 101 may be configured to determine one or more parameters and/or information for one or more operations and/or tasks, e.g., path planning, and/or any other tasks.

In some demonstrative aspects, radar device 101 may be configured to map a scene by measuring targets' echoes (reflectivity) and discriminating them, for example, mainly in range, velocity, azimuth and/or elevation, e.g., as described below.

In some demonstrative aspects, radar device 101 may be configured to detect, and/or sense, one or more objects, which are located in a vicinity, e.g., a far vicinity and/or a near vicinity, of the vehicle 100, and to provide one or more parameters, attributes, and/or information with respect to the objects.

In some demonstrative aspects, the objects may include road users, such as other vehicles, pedestrians; road objects and markings, such as traffic signs, traffic lights, lane markings, road markings, road elements, e.g., a pavement-road meeting, a road edge, a road profile, road roughness (or smoothness); general objects, such as a hazard, e.g., a tire, a box, a crack in the road surface; and/or the like.

In some demonstrative aspects, the one or more parameters, attributes and/or information with respect to the object may include a range of the objects from the vehicle 100, an angle of the object with respect to the vehicle 100, a location of the object with respect to the vehicle 100, a relative speed of the object with respect to vehicle 100, and/or the like.

In some demonstrative aspects, radar device 101 may include a Multiple Input Multiple Output (MIMO) radar device 101, e.g., as described below.

In one example, the MIMO radar device may be configured to utilize "spatial filtering" processing, for example, beamforming and/or any other mechanism, for one or both of Transmit (Tx) signals and/or Receive (Rx) signals.

Some demonstrative aspects are described below with respect to a radar device, e.g., radar device 101, implemented as a MIMO radar. However, in other aspects, radar device 101 may be implemented as any other type of radar utilizing a plurality of antenna elements, e.g., a Single Input Multiple Output (SIMO) radar or a Multiple Input Single output (MISO) radar.

Some demonstrative aspects may be implemented with respect to a radar device, e.g., radar device 101, implemented as a MIMO radar, e.g., as described below. However, in other aspects, radar device 101 may be implemented as any other type of radar, for example, an Electronic Beam Steering radar, a Synthetic Aperture Radar (SAR), adaptive and/or cognitive radars that change their transmission according to the environment and/or ego state, a reflect array radar, or the like.

In some demonstrative aspects, radar device 101 may include an antenna arrangement 102, a radar frontend 103 configured to communicate radar signals via the antenna arrangement 102, and a radar processor 104 configured to generate radar information based on the radar signals, e.g., as described below.

In some demonstrative aspects, radar processor 104 may be configured to process radar information of radar device 101 and/or to control one or more operations of radar device 101, e.g., as described below.

In some demonstrative aspects, radar processor 104 may include, or may be implemented, partially or entirely, by circuitry and/or logic, e.g., one or more processors including circuitry and/or logic, memory circuitry and/or logic. Additionally or alternatively, one or more functionalities of radar processor 104 may be implemented by logic, which may be executed by a machine and/or one or more processors, e.g., as described below.

In one example, radar processor 104 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In other aspects, radar processor 104 may be implemented by one or more additional or alternative elements of vehicle 100.

In some demonstrative aspects, radar frontend 103 may include, for example, one or more (radar) transmitters, and a one or more (radar) receivers, e.g., as described below.

In some demonstrative aspects, antenna arrangement 102 may include a plurality of antennas to communicate the radar signals. For example, antenna arrangement 102 may include multiple transmit antennas in the form of a transmit antenna array, and multiple receive antennas in the form of a receive antenna array. In another example, antenna arrangement 102 may include one or more antennas used both as transmit and receive antennas. In the latter case, the radar frontend 103, for example, may include a duplexer or a circulator, e.g., a circuit to separate transmitted signals from received signals.

In some demonstrative aspects, as shown in FIG. 1, the radar frontend 103 and the antenna arrangement 102 may be controlled, e.g., by radar processor 104, to transmit a radio transmit signal 105.

In some demonstrative aspects, as shown in FIG. 1, the radio transmit signal 105 may be reflected by an object 106, resulting in an echo 107.

In some demonstrative aspects, the radar device 101 may receive the echo 107, e.g., via antenna arrangement 102 and radar frontend 103, and radar processor 104 may generate radar information, for example, by calculating information about position, radial velocity (Doppler), and/or direction of the object 106, e.g., with respect to vehicle 100.

In some demonstrative aspects, radar processor 104 may be configured to provide the radar information to a vehicle controller 108 of the vehicle 100, e.g., for autonomous driving of the vehicle 100.

In some demonstrative aspects, at least part of the functionality of radar processor 104 may be implemented as part of vehicle controller 108. In other aspects, the functionality of radar processor 104 may be implemented as part of any other element of radar device 101 and/or vehicle 100. In other aspects, radar processor 104 may be implemented, as a separate part of, or as part of any other element of radar device 101 and/or vehicle 100.

In some demonstrative aspects, vehicle controller 108 may be configured to control one or more functionalities, modes of operation, components, devices, systems, and/or elements of vehicle 100.

In some demonstrative aspects, vehicle controller 108 may be configured to control one or more vehicular systems of vehicle 100, e.g., as described below.

In some demonstrative aspects, the vehicular systems may include, for example, a steering system, a braking system, a driving system, and/or any other system of the vehicle 100.

In some demonstrative aspects, vehicle controller 108 may configured to control radar device 101, and/or to process one or parameters, attributes and/or information from radar device 101.

In some demonstrative aspects, vehicle controller 108 may be configured, for example, to control the vehicular systems of the vehicle 100, for example, based on radar information from radar device 101 and/or one or more other sensors of the vehicle 100, e.g., Light Detection and Ranging (LIDAR) sensors, camera sensors, and/or the like.

In one example, vehicle controller 108 may control the steering system, the braking system, and/or any other vehicular systems of vehicle 100, for example, based on the information from radar device 101, e.g., based on one or more objects detected by radar device 101.

In other aspects, vehicle controller 108 may be configured to control any other additional or alternative functionalities of vehicle 100.

Some demonstrative aspects are described herein with respect to a radar device 101 implemented in a vehicle, e.g., vehicle 100. In other aspects a radar device, e.g., radar device 101, may be implemented as part of any other element of a traffic system or network, for example, as part of a road infrastructure, and/or any other element of a traffic network or system. Other aspects may be implemented with respect to any other system, environment, and/or apparatus, which may be implemented in any other object, environment, location, or place. For example, radar device 101 may be part of a non-vehicular device, which may be implemented, for example, in an indoor location, a stationary infrastructure outdoors, or any other location.

In some demonstrative aspects, radar device 101 may be configured to support security usage. In one example, radar device 101 may be configured to determine a nature of an operation, e.g., a human entry, an animal entry, an environmental movement, and the like, to identity a threat level of a detected event, and/or any other additional or alternative operations.

Some demonstrative aspects may be implemented with respect to any other additional or alternative devices and/or systems, for example, for a robot, e.g., as described below.

In other aspects, radar device 101 may be configured to support any other usages and/or applications.

Figure 2:
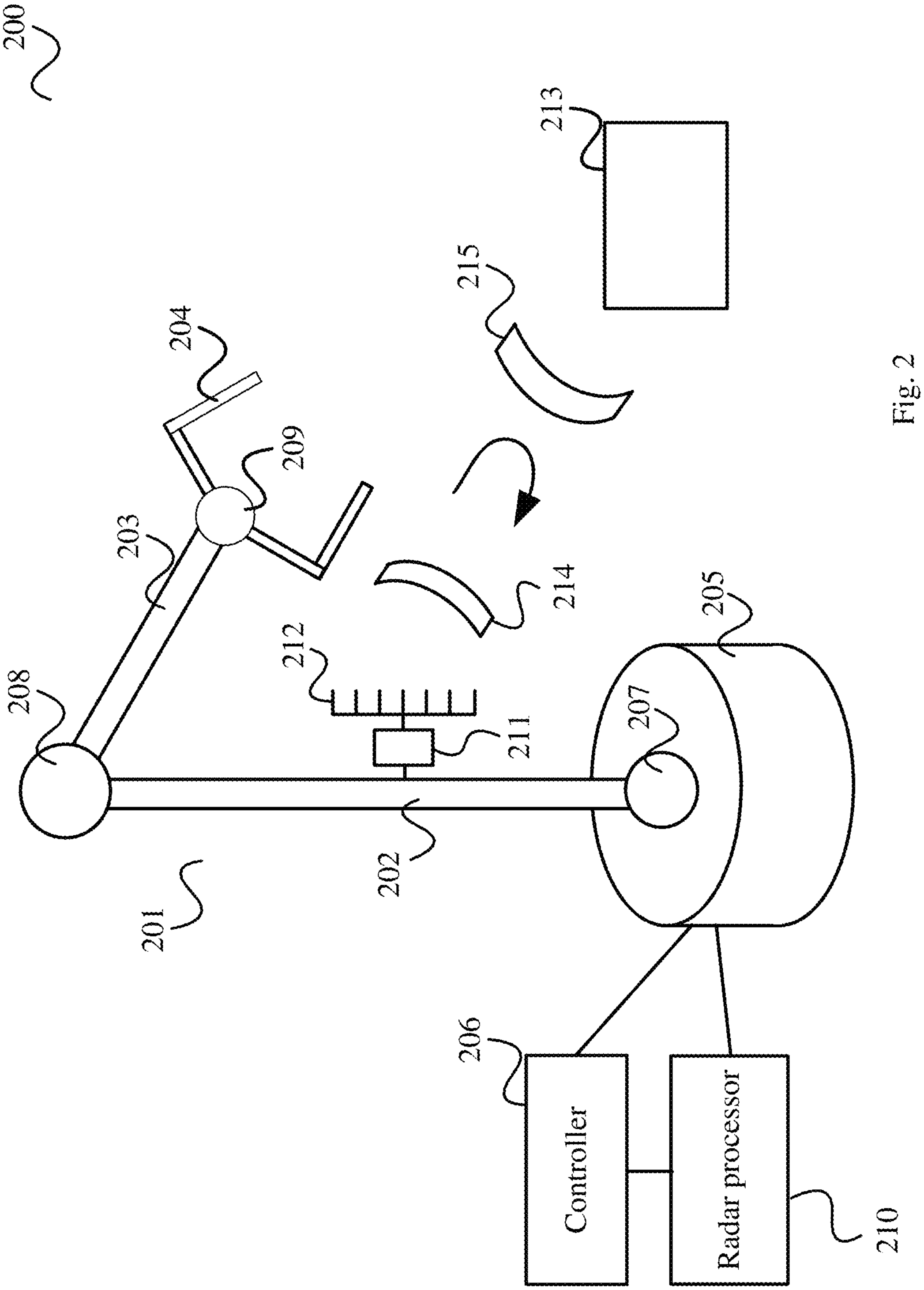
FIG. 2 is a schematic block diagram illustration of a robot implementing a radar, in accordance with some demonstrative aspects.

Reference is now made to FIG. 2, which schematically illustrates a block diagram of a robot 200 implementing a radar, in accordance with some demonstrative aspects.

In some demonstrative aspects, robot 200 may include a robot arm 201. The robot 200 may be implemented, for example, in a factory for handling an object 213, which may be, for example, a part that should be affixed to a product that is being manufactured. The robot arm 201 may include a plurality of movable members, for example, movable members 202, 203, 204, and a support 205. Moving the movable members 202, 203, and/or 204 of the robot arm 201, e.g., by actuation of associated motors, may allow physical interaction with the environment to carry out a task, e.g., handling the object 213.

In some demonstrative aspects, the robot arm 201 may include a plurality of joint elements, e.g., joint elements 207, 208, 209, which may connect, for example, the members 202, 203, and/or 204 with each other, and with the support 205. For example, a joint element 207, 208, 209 may have one or more joints, each of which may provide rotatable motion, e.g., rotational motion, and/or translatory motion, e.g., displacement, to associated members and/or motion of members relative to each other. The movement of the members 202, 203, 204 may be initiated by suitable actuators.

In some demonstrative aspects, the member furthest from the support 205, e.g., member 204, may also be referred to as the end-effector 204 and may include one or more tools, such as, a claw for gripping an object, a welding tool, or the like. Other members, e.g., members 202, 203, closer to the support 205, may be utilized to change the position of the end-effector 204, e.g., in three-dimensional space. For example, the robot arm 201 may be configured to function similarly to a human arm, e.g., possibly with a tool at its end.

In some demonstrative aspects, robot 200 may include a (robot) controller 206 configured to implement interaction with the environment, e.g., by controlling the robot arm's actuators, according to a control program, for example, in order to control the robot arm 201 according to the task to be performed.

In some demonstrative aspects, an actuator may include a component adapted to affect a mechanism or process in response to being driven. The actuator can respond to commands given by the controller 206 (the so-called activation) by performing mechanical movement. This means that an actuator, typically a motor (or electromechanical converter), may be configured to convert electrical energy into mechanical energy when it is activated (i.e. actuated).

In some demonstrative aspects, controller 206 may be in communication with a radar processor 210 of the robot 200.

In some demonstrative aspects, a radar fronted 211 and a radar antenna arrangement 212 may be coupled to the radar processor 210. In one example, radar fronted 211 and/or radar antenna arrangement 212 may be included, for example, as part of the robot arm 201.

In some demonstrative aspects, the radar frontend 211, the radar antenna arrangement 212 and the radar processor 210 may be operable as, and/or may be configured to form, a radar device. For example, antenna arrangement 212 may be configured to perform one or more functionalities of antenna arrangement 102 (FIG. 1), radar frontend 211 may be configured to perform one or more functionalities of radar frontend 103 (FIG. 1), and/or radar processor 210 may be configured to perform one or more functionalities of radar processor 104 (FIG. 1), e.g., as described above.

In some demonstrative aspects, for example, the radar frontend 211 and the antenna arrangement 212 may be controlled, e.g., by radar processor 210, to transmit a radio transmit signal 214.

In some demonstrative aspects, as shown in FIG. 2, the radio transmit signal 214 may be reflected by the object 213, resulting in an echo 215.

In some demonstrative aspects, the echo 215 may be received, e.g., via antenna arrangement 212 and radar frontend 211, and radar processor 210 may generate radar information, for example, by calculating information about position, speed (Doppler) and/or direction of the object 213, e.g., with respect to robot arm 201.

In some demonstrative aspects, radar processor 210 may be configured to provide the radar information to the robot controller 206 of the robot arm 201, e.g., to control robot arm 201. For example, robot controller 206 may be configured to control robot arm 201 based on the radar information, e.g., to grab the object 213 and/or to perform any other operation.

Figure 3:
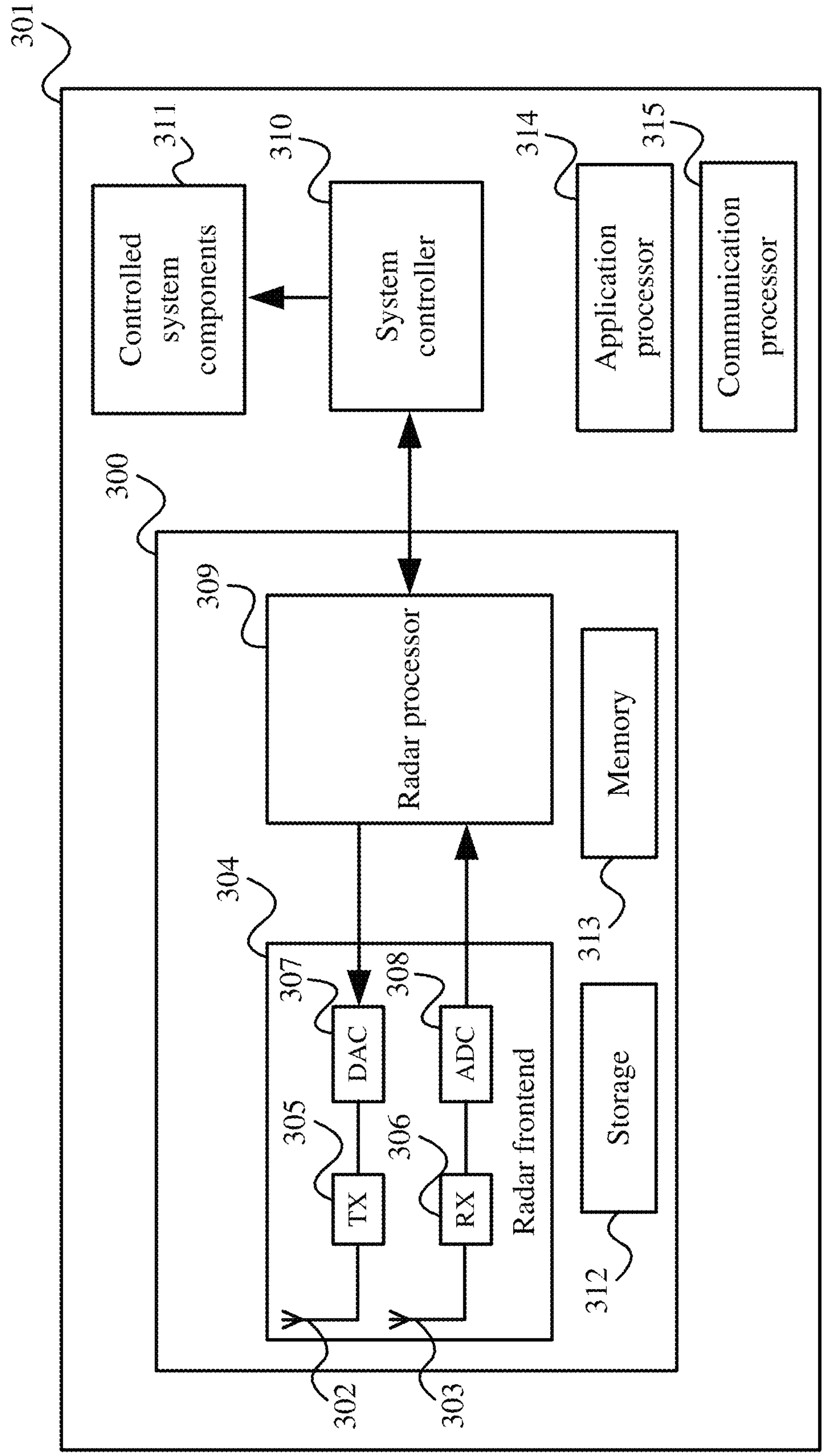
FIG. 3 is a schematic block diagram illustration of a radar apparatus, in accordance with some demonstrative aspects.

Reference is made to FIG. 3, which schematically illustrates a radar apparatus 300, in accordance with some demonstrative aspects.

In some demonstrative aspects, radar apparatus 300 may be implemented as part of a device or system 301, e.g., as described below.

For example, radar apparatus 300 may be implemented as part of, and/or may configured to perform one or more operations and/or functionalities of, the devices or systems described above with reference to FIG. 1 an/or FIG. 2. In other aspects, radar apparatus 300 may be implemented as part of any other device or system 301.

In some demonstrative aspects, radar device 300 may include an antenna arrangement, which may include one or more transmit antennas 302 and one or more receive antennas 303. In other aspects, any other antenna arrangement may be implemented.

In some demonstrative aspects, radar device 300 may include a radar frontend 304, and a radar processor 309.

In some demonstrative aspects, as shown in FIG. 3, the one or more transmit antennas 302 may be coupled with a transmitter (or transmitter arrangement) 305 of the radar frontend 304; and/or the one or more receive antennas 303 may be coupled with a receiver (or receiver arrangement) 306 of the radar frontend 304, e.g., as described below.

In some demonstrative aspects, transmitter 305 may include one or more elements, for example, an oscillator, a power amplifier and/or one or more other elements, configured to generate radio transmit signals to be transmitted by the one or more transmit antennas 302, e.g., as described below.

In some demonstrative aspects, for example, radar processor 309 may provide digital radar transmit data values to the radar frontend 304. For example, radar frontend 304 may include a Digital-to-Analog Converter (DAC) 307 to convert the digital radar transmit data values to an analog transmit signal. The transmitter 305 may convert the analog transmit signal to a radio transmit signal which is to be transmitted by transmit antennas 302.

In some demonstrative aspects, receiver 306 may include one or more elements, for example, one or more mixers, one or more filters and/or one or more other elements, configured to process, down-convert, radio signals received via the one or more receive antennas 303, e.g., as described below.

In some demonstrative aspects, for example, receiver 306 may convert a radio receive signal received via the one or more receive antennas 303 into an analog receive signal. The radar frontend 304 may include an Analog-to-Digital Converter (ADC) 308 to generate digital radar reception data values based on the analog receive signal. For example, radar frontend 304 may provide the digital radar reception data values to the radar processor 309.

In some demonstrative aspects, radar processor 309 may be configured to process the digital radar reception data values, for example, to detect one or more objects, e.g., in an environment of the device/system 301. This detection may include, for example, the determination of information including one or more of range, speed (Doppler), direction, and/or any other information, of one or more objects, e.g., with respect to the system 301.

In some demonstrative aspects, radar processor 309 may be configured to provide the determined radar information to a system controller 310 of device/system 301. For example, system controller 310 may include a vehicle controller, e.g., if device/system 301 includes a vehicular device/system, a robot controller, e.g., if device/system 301 includes a robot device/system, or any other type of controller for any other type of device/system 301.

In some demonstrative aspects, the radar information from radar processor 309 may be processed, e.g., by system controller 310 and/or any other element of system 301, for example, in combination with information from one or more other of information sources, for example, LiDAR information from a LiDAR processor, vision information from a vision-based processor, or the like.

In some demonstrative aspects, an environmental model of an environment of system 301 may be determined, e.g., by system controller 310 and/or any other element of system 301, for example, based on the radar information from radar processor 309, and/or the information from one or more other of information sources.

In some demonstrative aspects, a driving policy system, e.g., which may be implemented by system controller 310 and/or any other element of system 301, may process the environmental model, for example, to decide on one or more actions, which may be taken.

In some demonstrative aspects, system controller 310 may be configured to control one or more controlled system components 311 of the system 301, e.g. a motor, a brake, steering, and the like, e.g. by one or more corresponding actuators, for example, based on the one or more action decisions.

In some demonstrative aspects, radar device 300 may include a storage 312 or a memory 313, e.g., to store information processed by radar 300, for example, digital radar reception data values being processed by the radar processor 309, radar information generated by radar processor 309, and/or any other data to be processed by radar processor 309.

In some demonstrative aspects, device/system 301 may include, for example, an application processor 314 and/or a communication processor 315, for example, to at least partially implement one or more functionalities of system controller 310 and/or to perform communication between system controller 310, radar device 300, the controlled system components 311, and/or one or more additional elements of device/system 301.

In some demonstrative aspects, radar device 300 may be configured to generate and transmit the radio transmit signal in a form, which may support determination of range, speed, and/or direction, e.g., as described below.

For example, a radio transmit signal of a radar may be configured to include a plurality of pulses. For example, a pulse transmission may include the transmission of short high-power bursts in combination with times during which the radar device listens for echoes.

For example, in order to more optimally support a highly dynamic situation, e.g., in an automotive scenario, a Continuous Wave (CW) may instead be used as the radio transmit signal. However, a continuous wave, e.g., with constant frequency, may support velocity determination, but may not allow range determination, e.g., due to the lack of a time mark that could allow distance calculation.

In some demonstrative aspects, radio transmit signal 105 (FIG. 1) may be transmitted according to technologies such as, for example, Frequency-Modulated Continuous Wave (FMCW) radar, Phase-Modulated Continuous Wave (PMCW) radar, Orthogonal Frequency Division Multiplexing (OFDM) radar, and/or any other type of radar technology, which may support determination of range, velocity, and/or direction, e.g., as described below.

Figure 4:
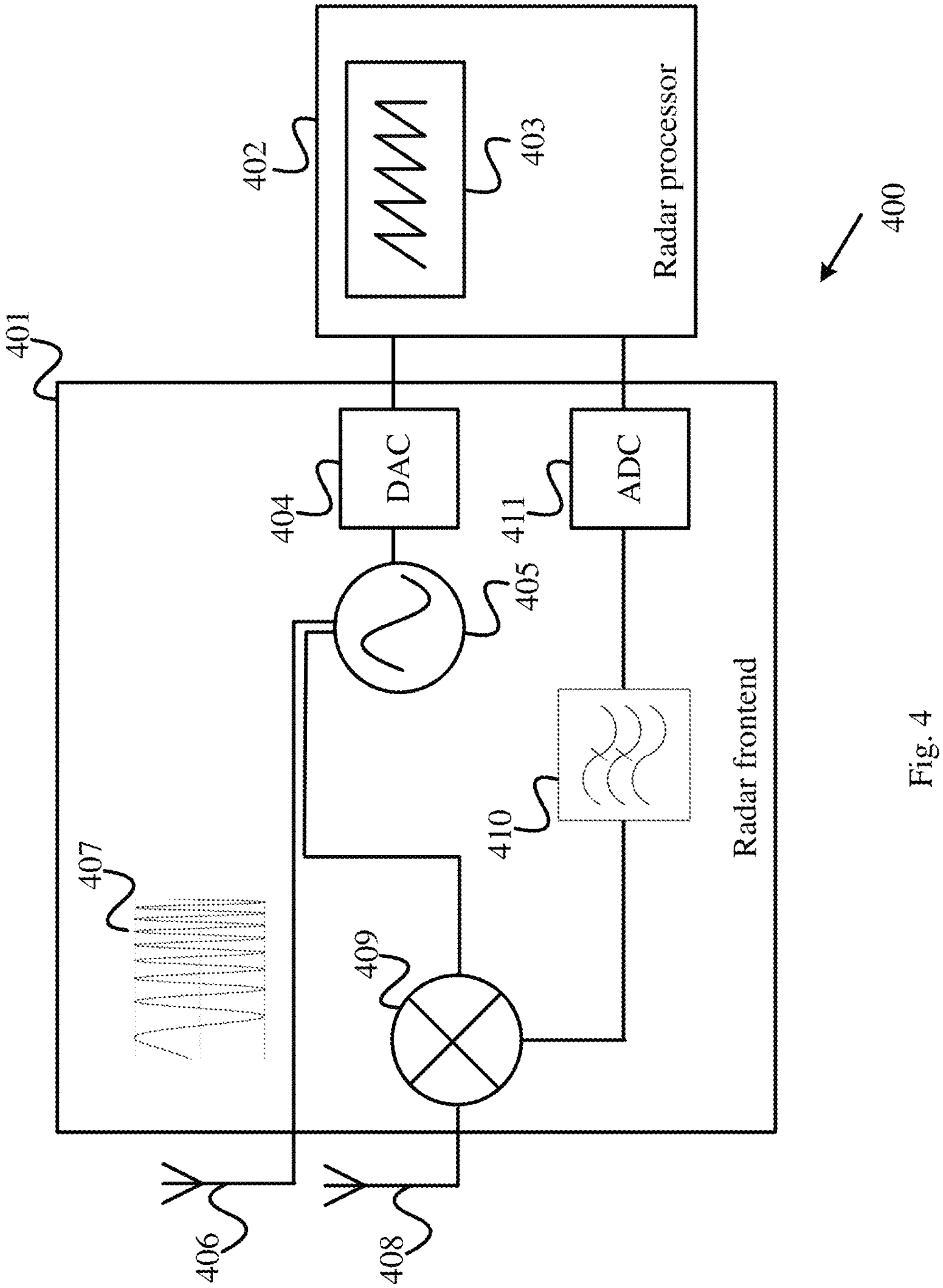
FIG. 4 is a schematic block diagram illustration of a Frequency-Modulated Continuous Wave (FMCW) radar apparatus, in accordance with some demonstrative aspects.

Reference is made to FIG. 4, which schematically illustrates a FMCW radar apparatus, in accordance with some demonstrative aspects.

In some demonstrative aspects, FMCW radar device 400 may include a radar frontend 401, and a radar processor 402. For example, radar frontend 304 (FIG. 3) may include one or more elements of, and/or may perform one or more operations and/or functionalities of, radar frontend 401; and/or radar processor 309 (FIG. 3) may include one or more elements of, and/or may perform one or more operations and/or functionalities of, radar processor 402.

In some demonstrative aspects, FMCW radar device 400 may be configured to communicate radio signals according to an FMCW radar technology, e.g., rather than sending a radio transmit signal with a constant frequency.

In some demonstrative aspects, radio frontend 401 may be configured to ramp up and reset the frequency of the transmit signal, e.g., periodically, for example, according to a saw tooth waveform 403. In other aspects, a triangle waveform, or any other suitable waveform may be used.

In some demonstrative aspects, for example, radar processor 402 may be configured to provide waveform 403 to frontend 401, for example, in digital form, e.g., as a sequence of digital values.

In some demonstrative aspects, radar frontend 401 may include a DAC 404 to convert waveform 403 into analog form, and to supply it to a voltage-controlled oscillator 405. For example, oscillator 405 may be configured to generate an output signal, which may be frequency-modulated in accordance with the waveform 403.

In some demonstrative aspects, oscillator 405 may be configured to generate the output signal including a radio transmit signal, which may be fed to and sent out by one or more transmit antennas 406.

In some demonstrative aspects, the radio transmit signal generated by the oscillator 405 may have the form of a sequence of chirps 407, which may be the result of the modulation of a sinusoid with the saw tooth waveform 403.

In one example, a chirp 407 may correspond to the sinusoid of the oscillator signal frequency-modulated by a "tooth" of the saw tooth waveform 403, e.g., from the minimum frequency to the maximum frequency.

In some demonstrative aspects, FMCW radar device 400 may include one or more receive antennas 408 to receive a radio receive signal. The radio receive signal may be based on the echo of the radio transmit signal, e.g., in addition to any noise, interference, or the like.

In some demonstrative aspects, radar frontend 401 may include a mixer 409 to mix the radio transmit signal with the radio receive signal into a mixed signal.

In some demonstrative aspects, radar frontend 401 may include a filter, e.g., a Low Pass Filter (LPF) 410, which may be configured to filter the mixed signal from the mixer 409 to provide a filtered signal. For example, radar frontend 401 may include an ADC 411 to convert the filtered signal into digital reception data values, which may be provided to radar processor 402. In another example, the filter 410 may be a digital filter, and the ADC 411 may be arranged between the mixer 409 and the filter 410.

In some demonstrative aspects, radar processor 402 may be configured to process the digital reception data values to provide radar information, for example, including range, speed (velocity/Doppler), and/or direction (AoA) information of one or more objects.

In some demonstrative aspects, radar processor 402 may be configured to perform a first Fast Fourier Transform (FFT) (also referred to as "range FFT") to extract a delay response, which may be used to extract range information, and/or a second FFT (also referred to as "Doppler FFT") to extract a Doppler shift response, which may be used to extract velocity information, from the digital reception data values.

In other aspects, any other additional or alternative methods may be utilized to extract range information. In one example, in a digital radar implementation, a correlation with the transmitted signal may be used, e.g., according to a matched filter implementation.

Figure 5:
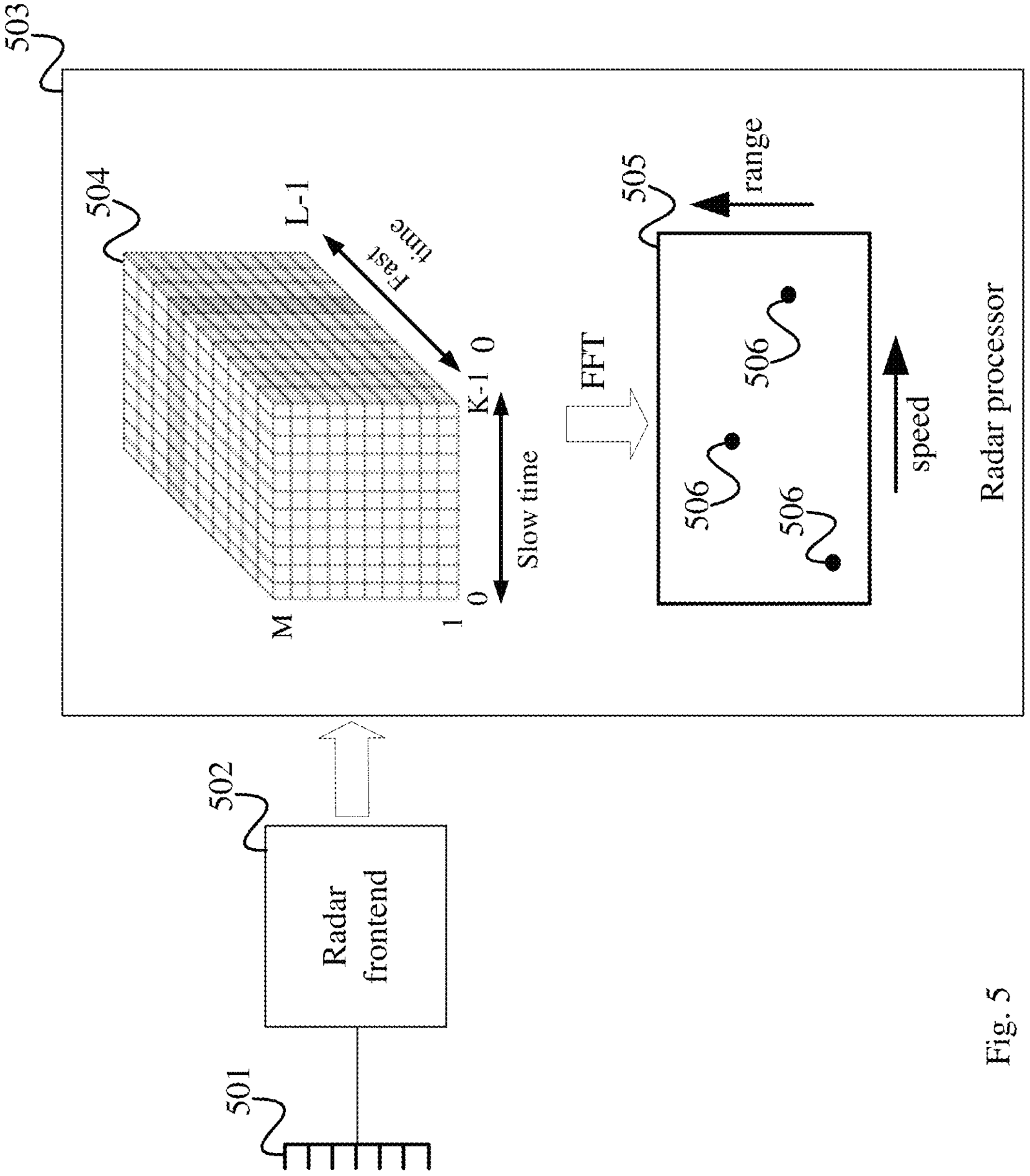
FIG. 5 is a schematic illustration of an extraction scheme, which may be implemented to extract range and speed (Doppler) estimations from digital reception radar data values, in accordance with some demonstrative aspects.

Reference is made to FIG. 5, which schematically illustrates an extraction scheme, which may be implemented to extract range and speed (Doppler) estimations from digital reception radar data values, in accordance with some demonstrative aspects. For example, radar processor 104 (FIG. 1), radar processor 210 (FIG. 2), radar processor 309 (FIG. 3), and/or radar processor 402 (FIG. 4), may be configured to extract range and/or speed (Doppler) estimations from digital reception radar data values according to one or more aspects of the extraction scheme of FIG. 5.

In some demonstrative aspects, as shown in FIG. 5, a radio receive signal, e.g., including echoes of a radio transmit signal, may be received by a receive antenna array 501. The radio receive signal may be processed by a radio radar frontend 502 to generate digital reception data values, e.g., as described above. The radio radar frontend 502 may provide the digital reception data values to a radar processor 503, which may process the digital reception data values to provide radar information, e.g., as described above.

In some demonstrative aspects, the digital reception data values may be represented in the form of a data cube 504. For example, the data cube 504 may include digitized samples of the radio receive signal, which is based on a radio signal transmitted from a transmit antenna and received by M receive antennas. In some demonstrative aspects, for example, with respect to a MIMO implementation, there may be multiple transmit antennas, and the number of samples may be multiplied accordingly.

In some demonstrative aspects, a layer of the data cube 504, for example, a horizontal layer of the data cube 504, may include samples of an antenna, e.g., a respective antenna of the M antennas.

In some demonstrative aspects, data cube 504 may include samples for K chirps. For example, as shown in FIG. 5, the samples of the chirps may be arranged in a so-called "slow time"-direction.

In some demonstrative aspects, the data cube 504 may include L samples, e.g., L=512 or any other number of samples, for a chirp, e.g., per each chirp. For example, as shown in FIG. 5, the samples per chirp may be arranged in a so-called "fast time"-direction of the data cube 504.

In some demonstrative aspects, processor 504 may be configured to determine the range values, Doppler values, and/or Angle of Arrival (AoA) values, e.g., Azimuth values and/or Elevation values, for example, based on FFT techniques, e.g., as described below.

In other aspects, processor 504 may be configured to determine the range values, Doppler values, and/or Angle of Arrival (AoA) values, e.g., Azimuth values and/or Elevation values, for example, based on Super-Resolution (SR) techniques, and/or any other suitable processing technique.

In some demonstrative aspects, radar processor 503 may be configured to process a plurality of samples, e.g., L samples collected for each chirp and for each antenna, by a first FFT. The first FFT may be performed, for example, for each chirp and each antenna, such that a result of the processing of the data cube 504 by the first FFT may again have three dimensions, and may have the size of the data cube 504 while including values for L range bins, e.g., instead of the values for the L sampling times.

In some demonstrative aspects, radar processor 503 may be configured to process the result of the processing of the data cube 504 by the first FFT, for example, by processing the result according to a second FFT along the chirps, e.g., for each antenna and for each range bin.

For example, the first FFT may be in the "fast time" direction, and the second FFT may be in the "slow time" direction.

In some demonstrative aspects, the result of the second FFT may provide, e.g., when aggregated over the antennas, a range/Doppler (R/D) map 505. The R/D map may have FFT peaks 506, for example, including peaks of FFT output values (in terms of absolute values) for certain range/speed combinations, e.g., for range/Doppler bins. For example, a range/Doppler bin may correspond to a range bin and a Doppler bin. For example, radar processor 503 may consider a peak as potentially corresponding to an object, e.g., of the range and speed corresponding to the peak's range bin and speed bin.

In some demonstrative aspects, the extraction scheme of FIG. 5 may be implemented for an FMCW radar, e.g., FMCW radar 400 (FIG. 4), as described above. In other aspects, the extraction scheme of FIG. 5 may be implemented for any other radar type. In one example, the radar processor 503 may be configured to determine a range/Doppler map 505 from digital reception data values of a PMCW radar, an OFDM radar, or any other radar technologies. For example, in adaptive or cognitive radar, the pulses in a frame, the waveform and/or modulation may be changed over time, e.g., according to the environment.

Referring back to FIG. 3, in some demonstrative aspects, receive antenna arrangement 303 may be implemented using a receive antenna array having a plurality of receive antennas (or receive antenna elements). For example, radar processor 309 may be configured to determine an angle of arrival of the received radio signal, e.g., echo 107 (FIG. 1) and/or echo 215 (FIG. 2). For example, radar processor 309 may be configured to determine a direction of a detected object, e.g., with respect to the device/system 301, for example, based on the angle of arrival of the received radio signal, e.g., as described below.

Figure 6:
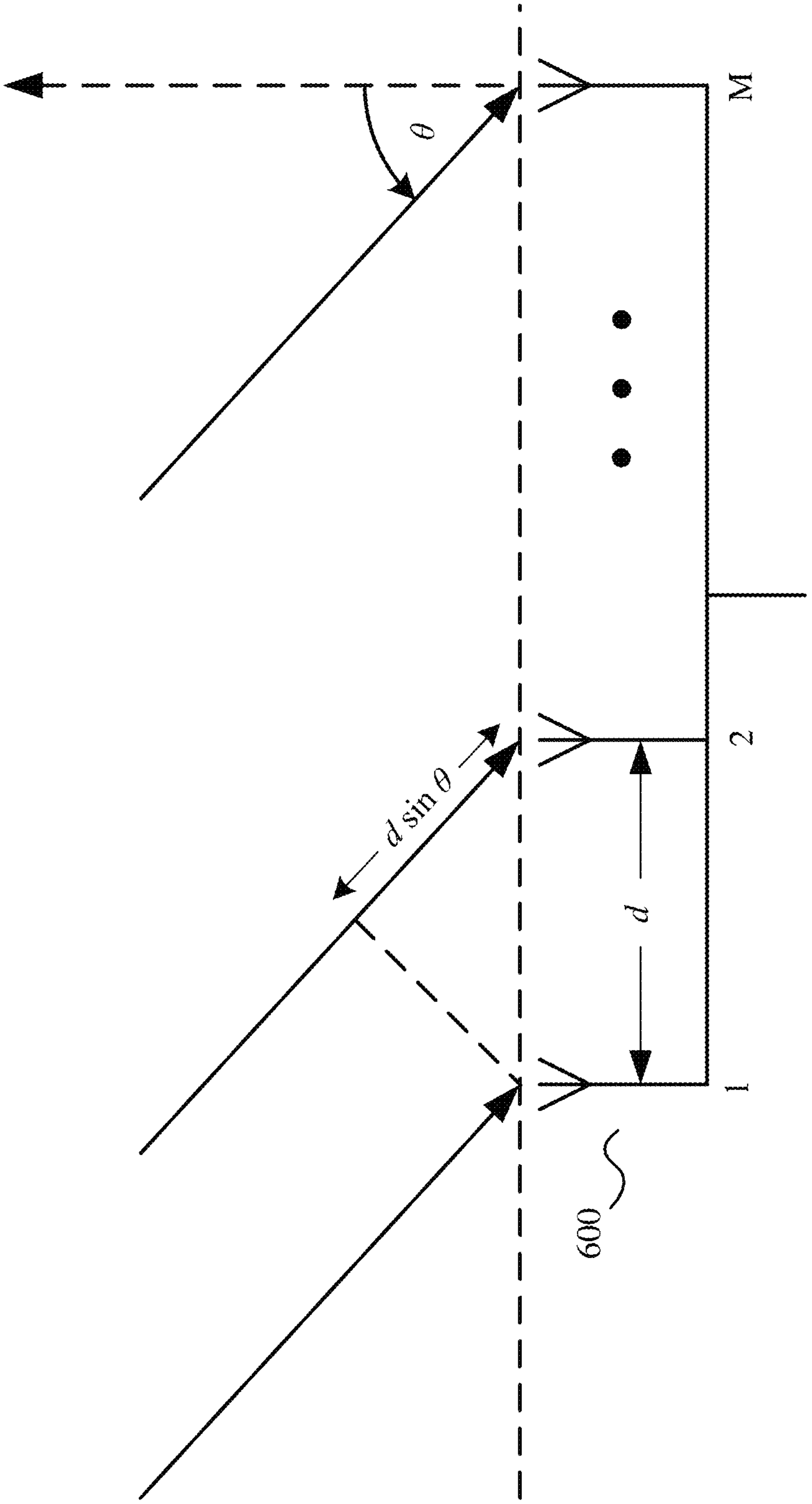
FIG. 6 is a schematic illustration of an angle-determination scheme, which may be implemented to determine Angle of Arrival (AoA) information based on an incoming radio signal received by a receive antenna array, in accordance with some demonstrative aspects.

Reference is made to FIG. 6, which schematically illustrates an angle-determination scheme, which may be implemented to determine Angle of Arrival (AoA) information based on an incoming radio signal received by a receive antenna array 600, in accordance with some demonstrative aspects.

FIG. 6 depicts an angle-determination scheme based on received signals at the receive antenna array.

In some demonstrative aspects, for example, in a virtual MIMO array, the angle-determination may also be based on the signals transmitted by the array of Tx antennas.

FIG. 6 depicts a one-dimensional angle-determination scheme. Other multi-dimensional angle determination schemes, e.g., a two-dimensional scheme or a three-dimensional scheme, may be implemented.

In some demonstrative aspects, as shown in FIG. 6, the receive antenna array 600 may include M antennas (numbered, from left to right, 1 to M).

As shown by the arrows in FIG. 6, it is assumed that an echo is coming from an object located at the top left direction. Accordingly, the direction of the echo, e.g., the incoming radio signal, may be towards the bottom right. According to this example, the further to the left a receive antenna is located, the earlier it will receive a certain phase of the incoming radio signal.

For example, a phase difference, denoted $\Delta\varphi$, between two antennas of the receive antenna array 600 may be determined, e.g., as follows:

$$\Delta\varphi = \frac{2\pi}{\lambda} \cdot d \cdot \sin(\theta)$$

wherein $\lambda$ denotes a wavelength of the incoming radio signal, d denotes a distance between the two antennas, and $\theta$ denotes an angle of arrival of the incoming radio signal, e.g., with respect to a normal direction of the array.

In some demonstrative aspects, radar processor 309 (FIG. 3) may be configured to utilize this relationship between phase and angle of the incoming radio signal, for example, to determine the angle of arrival of echoes, for example by performing an FFT, e.g., a third FFT ("angular FFT") over the antennas.

In some demonstrative aspects, multiple transmit antennas, e.g., in the form of an antenna array having multiple transmit antennas, may be used, for example, to increase the spatial resolution, e.g., to provide high-resolution radar information. For example, a MIMO radar device may utilize a virtual MIMO radar antenna, which may be formed as a convolution of a plurality of transmit antennas convolved with a plurality of receive antennas.

Figure 7:
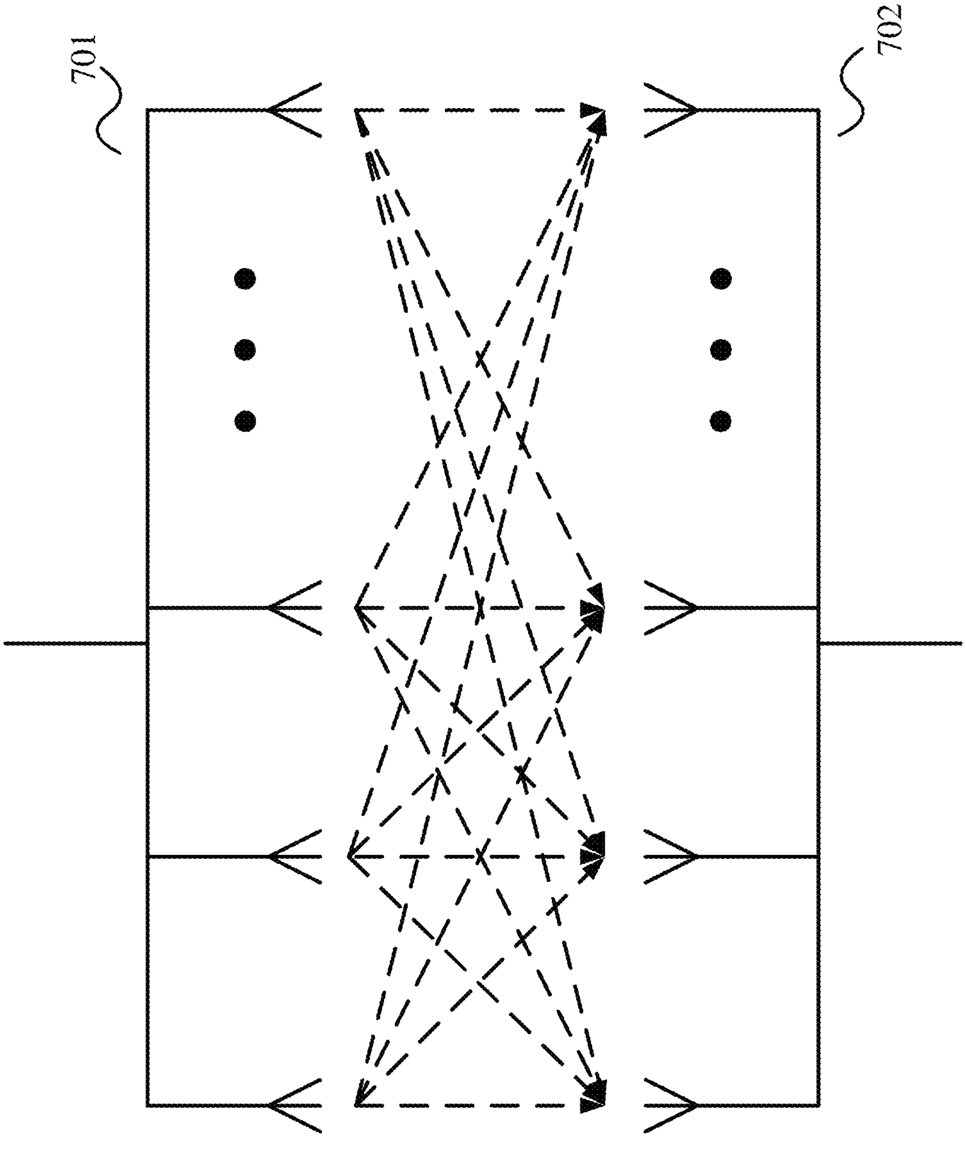
FIG. 7 is a schematic illustration of a Multiple-Input-Multiple-Output (MIMO) radar antenna scheme, which may be implemented based on a combination of Transmit (Tx) and Receive (Rx) antennas, in accordance with some demonstrative aspects.

Reference is made to FIG. 7, which schematically illustrates a MIMO radar antenna scheme, which may be implemented based on a combination of Transmit (Tx) and Receive (Rx) antennas, in accordance with some demonstrative aspects.

In some demonstrative aspects, as shown in FIG. 7, a radar MIMO arrangement may include a transmit antenna array 701 and a receive antenna array 702. For example, the one or more transmit antennas 302 (FIG. 3) may be implemented to include transmit antenna array 701, and/or the one or more receive antennas 303 (FIG. 3) may be implemented to include receive antenna array 702.

In some demonstrative aspects, antenna arrays including multiple antennas both for transmitting the radio transmit signals and for receiving echoes of the radio transmit signals, may be utilized to provide a plurality of virtual channels as illustrated by the dashed lines in FIG. 7. For example, a virtual channel may be formed as a convolution, for example, as a Kronecker product, between a transmit antenna and a receive antenna, e.g., representing a virtual steering vector of the MIMO radar.

In some demonstrative aspects, a transmit antenna, e.g., each transmit antenna, may be configured to send out an individual radio transmit signal, e.g., having a phase associated with the respective transmit antenna.

For example, an array of N transmit antennas and M receive antennas may be implemented to provide a virtual MIMO array of size N×M. For example, the virtual MIMO array may be formed according to the Kronecker product operation applied to the Tx and Rx steering vectors.

Figure 8:
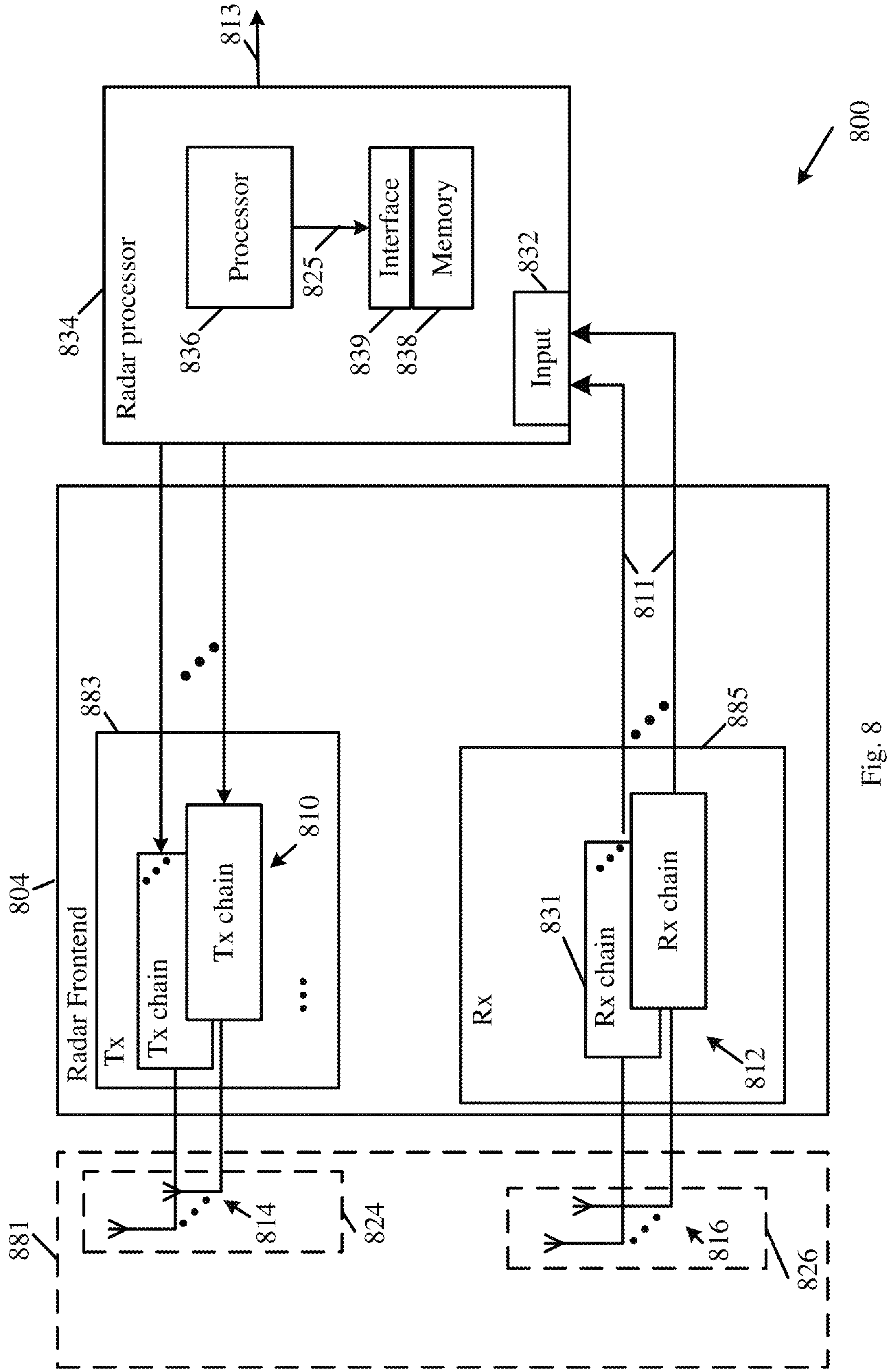
FIG. 8 is a schematic block diagram illustration of elements of a radar device including a radar frontend and a radar processor, in accordance with some demonstrative aspects.

FIG. 8 is a schematic block diagram illustration of elements of a radar device 800, in accordance with some demonstrative aspects. For example, radar device 101 (FIG. 1), radar device 300 (FIG. 3), and/or radar device 400 (FIG. 4), may include one or more elements of radar device 800, and/or may perform one or more operations and/or functionalities of radar device 800.

In some demonstrative aspects, as shown in FIG. 8, radar device 800 may include a radar frontend 804 and a radar processor 834. For example, radar frontend 103 (FIG. 1), radar frontend 211 (FIG. 1), radar frontend 304 (FIG. 3), radar frontend 401 (FIG. 4), and/or radar frontend 502 (FIG. 5), may include one or more elements of radar frontend 804, and/or may perform one or more operations and/or functionalities of radar frontend 804.

In some demonstrative aspects, radar frontend 804 may be implemented as part of a MIMO radar utilizing a MIMO radar antenna 881 including a plurality of Tx antennas 814 configured to transmit a plurality of Tx RF signals (also referred to as "Tx radar signals"); and a plurality of Rx antennas 816 configured to receive a plurality of Rx RF signals (also referred to as "Rx radar signals"), for example, based on the Tx radar signals, e.g., as described below.

In some demonstrative aspects, MIMO antenna array 881, antennas 814, and/or antennas 816 may include or may be part of any type of antennas suitable for transmitting and/or receiving radar signals. For example, MIMO antenna array 881, antennas 814, and/or antennas 816, may be implemented as part of any suitable configuration, structure, and/or arrangement of one or more antenna elements, components, units, assemblies, and/or arrays. For example, MIMO antenna array 881, antennas 814, and/or antennas 816, may be implemented as part of a phased array antenna, a multiple element antenna, a set of switched beam antennas, and/or the like. In some aspects, MIMO antenna array 881, antennas 814, and/or antennas 816, may be implemented to support transmit and receive functionalities using separate transmit and receive antenna elements. In some aspects, MIMO antenna array 881, antennas 814, and/or antennas 816, may be implemented to support transmit and receive functionalities using common and/or integrated transmit/receive elements.

In some demonstrative aspects, MIMO radar antenna 881 may include a rectangular MIMO antenna array, and/or curved array, e.g., shaped to fit a vehicle design.

In other aspects, any other form, shape, and/or arrangement of MIMO radar antenna 881 may be implemented.

In some demonstrative aspects, radar frontend 804 may include one or more radios configured to generate and transmit the Tx RF signals via Tx antennas 814; and/or to process the Rx RF signals received via Rx antennas 816, e.g., as described below.

In some demonstrative aspects, radar frontend 804 may include at least one transmitter (Tx) 883 including circuitry and/or logic configured to generate and/or transmit the Tx radar signals via Tx antennas 814.

In some demonstrative aspects, radar frontend 804 may include at least one receiver (Rx) 885 including circuitry and/or logic to receive and/or process the Rx radar signals received via Rx antennas 816, for example, based on the Tx radar signals.

In some demonstrative aspects, transmitter 883, and/or receiver 885 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative aspects, transmitter 883 may include a plurality of Tx chains 810 configured to generate and transmit the Tx RF signals via Tx antennas 814, e.g., respectively; and/or receiver 885 may include a plurality of Rx chains 812 configured to receive and process the Rx RF signals received via the Rx antennas 816, e.g., respectively.

In some demonstrative aspects, radar processor 834 may be configured to generate radar information 813, for example, based on the radar signals communicated by MIMO radar antenna 881, e.g., as described below. For example, radar processor 104 (FIG. 1), radar processor 210 (FIG. 2), radar processor 309 (FIG. 3), radar processor 402 (FIG. 4), and/or radar processor 503 (FIG. 5), may include one or more elements of radar processor 834, and/or may perform one or more operations and/or functionalities of radar processor 834.

In some demonstrative aspects, radar processor 834 may be configured to generate radar information 813, for example, based on radar Rx data 811 received from the plurality of Rx chains 812. For example, radar Rx data 811 may be based on the radar Rx signals received via the Rx antennas 816.

In some demonstrative aspects, radar processor 834 may include an input 832 to receive radar input data, e.g., including the radar Rx data 811 from the plurality of Rx chains 812.

In some demonstrative aspects, radar processor 834 may include, or may be implemented, partially or entirely, by circuitry and/or logic, e.g., one or more processors including circuitry and/or logic, memory circuitry and/or logic. Additionally or alternatively, one or more functionalities of radar processor 834 may be implemented by logic, which may be executed by a machine and/or one or more processors, e.g., as described below.

In some demonstrative aspects, radar processor 834 may include at least one processor 836, which may be configured, for example, to process the radar Rx data 811, and/or to perform one or more operations, methods, and/or algorithms.

In some demonstrative aspects, radar processor 834 may include at least one memory 838, e.g., coupled to the processor 836. For example, memory 838 may be configured to store data processed by radar processor 834. For example, memory 838 may store, e.g., at least temporarily, at least some of the information processed by the processor 836, and/or logic to be utilized by the processor 836.

In some demonstrative aspects, processor 836 may interface with memory 838, for example, via a memory interface 839.

In some demonstrative aspects, processor 836 may be configured to access memory 838, e.g., to write data to memory 838 and/or to read data from memory 838, for example, via memory interface 839.

In some demonstrative aspects, memory 838 may be configured to store at least part of the radar data, e.g., some of the radar Rx data or all of the radar Rx data, for example, for processing by processor 836, e.g., as described below.

In some demonstrative aspects, memory 838 may be configured to store processed data, which may be generated by processor 836, for example, during the process of generating the radar information 813, e.g., as described below.

In some demonstrative aspects, memory 838 may be configured to store range information and/or Doppler information, which may be generated by processor 836, for example, based on the radar Rx data. In one example, the range information and/or Doppler information may be determined based on a Cross-Correlation (XCORR) operation, which may be applied to the radar Rx data. Any other additional or alternative operation, algorithm, and/or procedure may be utilized to generate the range information and/or Doppler information.

In some demonstrative aspects, memory 838 may be configured to store AoA information, which may be generated by processor 836, for example, based on the radar Rx data, the range information and/or Doppler information. In one example, the AoA information may be determined based on an AoA estimation algorithm. Any other additional or alternative operation, algorithm, and/or procedure may be utilized to generate the AoA information.

In some demonstrative aspects, radar processor 834 may be configured to generate the radar information 813 including one or more of range information, Doppler information, and/or AoA information.

In some demonstrative aspects, the radar information 813 may include Point Cloud 1 (PC1) information, for example, including raw point cloud estimations, e.g., Range, Radial Velocity, Azimuth, and/or Elevation.

In some demonstrative aspects, the radar information 813 may include Point Cloud 2 (PC2) information, which may be generated, for example, based on the PC1 information. For example, the PC2 information may include clustering information, tracking information, e.g., tracking of probabilities and/or density functions, bounding box information, classification information, orientation information, and the like.

In some demonstrative aspects, the radar information 813 may include target tracking information corresponding to a plurality of targets in an environment of the radar device 800, e.g., as described below.

In some demonstrative aspects, radar processor 834 may be configured to generate the radar information 813 in the form of four Dimensional (4D) image information, e.g., a cube, which may represent 4D information corresponding to one or more detected targets.

In some demonstrative aspects, the 4D image information may include, for example, range values, e.g., based on the range information, velocity values, e.g., based on the Doppler information, azimuth values, e.g., based on azimuth AoA information, elevation values, e.g., based on elevation AoA information, and/or any other values.

In some demonstrative aspects, radar processor 834 may be configured to generate the radar information 813 in any other form, and/or including any other additional or alternative information.

In some demonstrative aspects, radar processor 834 may be configured to process the signals communicated via MIMO radar antenna 881 as signals of a virtual MIMO array formed by a convolution of the plurality of Rx antennas 816 and the plurality of Tx antennas 814.

In some demonstrative aspects, radar frontend 804 and/or radar processor 834 may be configured to utilize MIMO techniques, for example, to support a reduced physical array aperture, e.g., an array size, and/or utilizing a reduced number of antenna elements. For example, radar frontend 804 and/or radar processor 834 may be configured to transmit orthogonal signals via one or more Tx arrays 824 including a plurality of N elements, e.g., Tx antennas 814, and processing received signals via one or more Rx arrays 826 including a plurality of M elements, e.g., Rx antennas 816.

In some demonstrative aspects, utilizing the MIMO technique of transmission of the orthogonal signals from the Tx arrays 824 with N elements and processing the received signals in the Rx arrays 826 with M elements may be equivalent, e.g., under a far field approximation, to a radar utilizing transmission from one antenna and reception with N*M antennas. For example, radar frontend 804 and/or radar processor 834 may be configured to utilize MIMO antenna array 881 as a virtual array having an equivalent array size of N*M, which may define locations of virtual elements, for example, as a convolution of locations of physical elements, e.g., the antennas 814 and/or 816.

In some demonstrative aspects, a radar system may include a plurality of radar devices 800. For example, vehicle 100 (FIG. 1) may include a plurality of radar devices 800, e.g., as described below.

Figure 9:
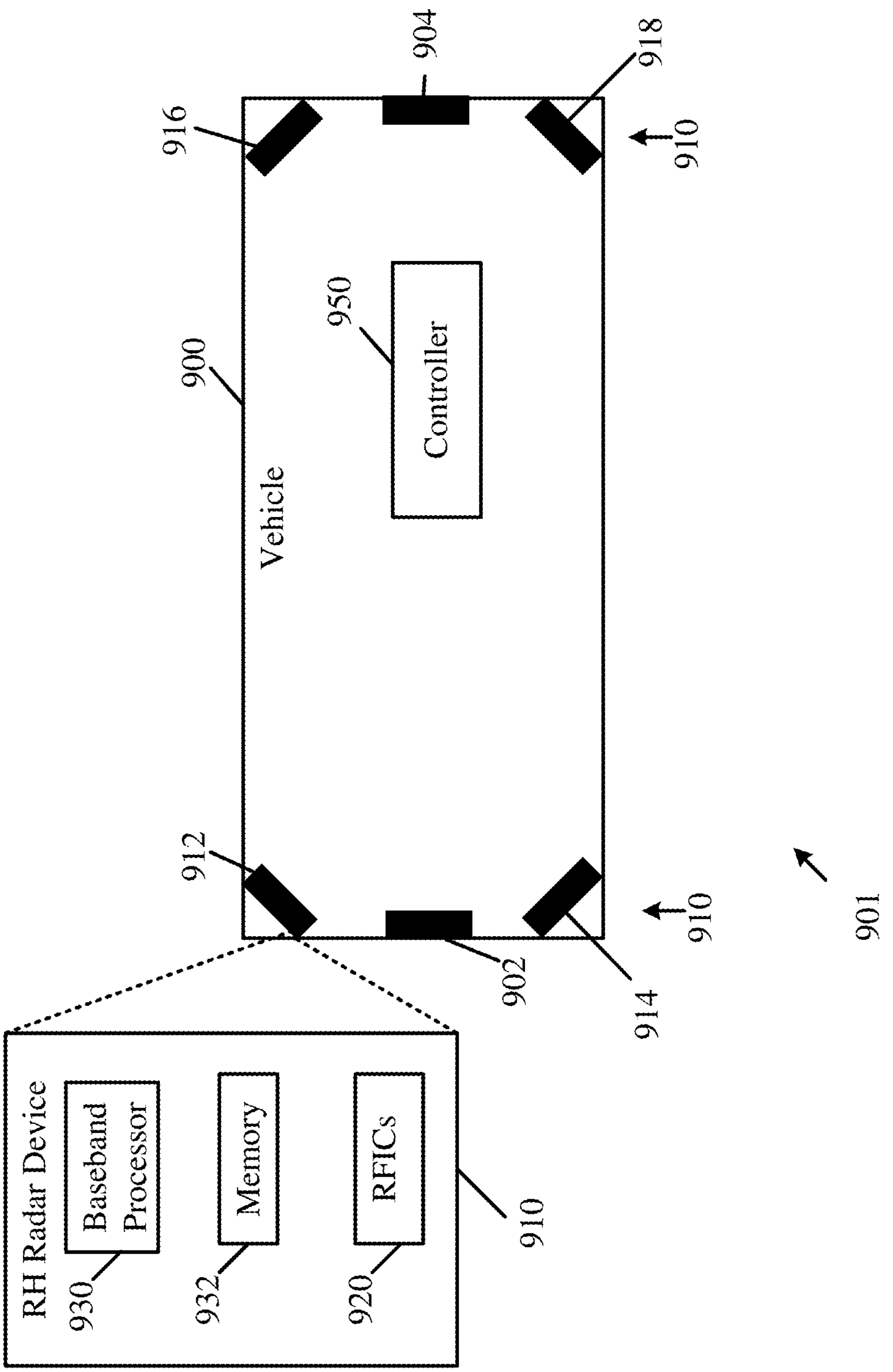
FIG. 9 is a schematic illustration of a radar system including a plurality of radar devices implemented in a vehicle, in accordance with some demonstrative aspects.

Reference is made to FIG. 9, which schematically illustrates a radar system 901 including a plurality of Radio Head (RH) radar devices (also referred to as RHs) 910 implemented in a vehicle 900, in accordance with some demonstrative aspects.

In some demonstrative aspects, as shown in FIG. 9, the plurality of RH radar devices 910 may be located, for example, at a plurality of positions around vehicle 900, for example, to provide radar sensing at a large field of view around vehicle 900, e.g., as described below.

In some demonstrative aspects, as shown in FIG. 9, the plurality of RH radar devices 910 may include, for example, six RH radar devices 910, e.g., as described below.

In some demonstrative aspects, the plurality of RH radar devices 910 may be located, for example, at a plurality of positions around vehicle 900, which may be configured to support 360-degrees radar sensing, e.g., a field of view of 360 degrees surrounding the vehicle 900, e.g., as described below.

In one example, the 360-degrees radar sensing may allow to provide a radar-based view of substantially all surroundings around vehicle 900, e.g., as described below.

In other aspects, the plurality of RH radar devices 910 may include any other number of RH radar devices 910, e.g., less than six radar devices or more than six radar devices.

In other aspects, the plurality of RH radar devices 910 may be positioned at any other locations and/or according to any other arrangement, which may support radar sensing at any other field of view around vehicle 900, e.g., 360-degrees radar sensing or radar sensing of any other field of view.

In some demonstrative aspects, as shown in FIG. 9, vehicle 900 may include a first RH radar device 902, e.g., a front RH, at a front-side of vehicle 900.

In some demonstrative aspects, as shown in FIG. 9, vehicle 900 may include a second RH radar device 904, e.g., a back RH, at a back-side of vehicle 900.

In some demonstrative aspects, as shown in FIG. 9, vehicle 900 may include one or more of RH radar devices at one or more respective corners of vehicle 900. For example, vehicle 900 may include a first corner RH radar device 912 at a first corner of vehicle 900, a second corner RH radar device 914 at a second corner of vehicle 900, a third corner RH radar device 916 at a third corner of vehicle 900, and/or a fourth corner RH radar device 918 at a fourth corner of vehicle 900.

In some demonstrative aspects, vehicle 900 may include one, some, or all, of the plurality of RH radar devices 910 shown in FIG. 9. For example, vehicle 900 may include the front RH radar device 902 and/or back RH radar device 904.

In other aspects, vehicle 900 may include any other additional or alternative radar devices, for example, at any other additional or alternative positions around vehicle 900. In one example, vehicle 900 may include a side radar, e.g., on a side of vehicle 900.

In some demonstrative aspects, as shown in FIG. 9, vehicle 900 may include a radar system controller 950 configured to control one or more, e.g., some or all, of the RH radar devices 910.

In some demonstrative aspects, at least part of the functionality of radar system controller 950 may be implemented by a dedicated controller, e.g., a dedicated system controller or central controller, which may be separate from the RH radar devices 910, and may be configured to control some or all of the RH radar devices 910.

In some demonstrative aspects, at least part of the functionality of radar system controller 950 may be implemented as part of at least one RH radar device 910.

In some demonstrative aspects, at least part of the functionality of radar system controller 950 may be implemented by a radar processor of an RH radar device 910. For example, radar processor 834 (FIG. 8) may include one or more elements of radar system controller 950, and/or may perform one or more operations and/or functionalities of radar system controller 950.

In some demonstrative aspects, at least part of the functionality of radar system controller 950 may be implemented by a system controller of vehicle 900. For example, vehicle controller 108 (FIG. 1) may include one or more elements of radar system controller 950, and/or may perform one or more operations and/or functionalities of radar system controller 950.

In other aspects, one or more functionalities of system controller 950 may be implemented as part of any other element of vehicle 900.

In some demonstrative aspects, as shown in FIG. 9, an RH radar device 910 of the plurality of RH radar devices 910, may include a baseband processor 930 (also referred to as a "Baseband Processing Unit (BPU)"), which may be configured to control communication of radar signals by the RH radar device 910, and/or to process radar signals communicated by the RH radar device 910. For example, baseband processor 930 may include one or more elements of radar processor 834 (FIG. 8), and/or may perform one or more operations and/or functionalities of radar processor 834 (FIG. 8).

In other aspects, an RH radar device 910 of the plurality of RH radar devices 910 may exclude one or more, e.g., some or all, functionalities of baseband processor 930. For example, controller 950 may be configured to perform one or more, e.g., some or all, functionalities of the baseband processor 930 for the RH.

In one example, controller 950 may be configured to perform baseband processing for all RH radar devices 910, and all RH radio devices 910 may be implemented without baseband processors 930.

In another example, controller 950 may be configured to perform baseband processing for one or more first RH radar devices 910, and the one or more first RH radio devices 910 may be implemented without baseband processors 930; and/or one or more second RH radar devices 910 may be implemented with one or more functionalities, e.g., some or all functionalities, of baseband processors 930.

In another example, one or more, e.g., some or all, RH radar devices 910 may be implemented with one or more functionalities, e.g., partial functionalities or full functionalities, of baseband processors 930.

In some demonstrative aspects, baseband processor 930 may include one or more components and/or elements configured for digital processing of radar signals communicated by the RH radar device 910, e.g., as described below.

In some demonstrative aspects, baseband processor 930 may include one or more FFT engines, matrix multiplication engines, DSP processors, and/or any other additional or alternative baseband, e.g., digital, processing components.

In some demonstrative aspects, as shown in FIG. 9, RH radar device 910 may include a memory 932, which may be configured to store data processed by, and/or to be processed by, baseband processor 930. For example, memory 932 may include one or more elements of memory 838 (FIG. 8), and/or may perform one or more operations and/or functionalities of memory 838 (FIG. 8).

In some demonstrative aspects, memory 932 may include an internal memory, and/or an interface to one or more external memories, e.g., an external Double Data Rate (DDR) memory, and/or any other type of memory.

In other aspects, an RH radar device 910 of the plurality of RH radar devices 910 may exclude memory 932. For example, the RH radar device 910 may be configured to provide radar data to controller 950, e.g., in the form of raw radar data.

In some demonstrative aspects, as shown in FIG. 9, RH radar device 910 may include one or more RF units, e.g., in the form of one or more RF Integrated Chips (RFICs) 920, which may be configured to communicate radar signals, e.g., as described below.

For example, an RFIC 920 may include one or more elements of front-end 804 (FIG. 8), and/or may perform one or more operations and/or functionalities of front-end 804 (FIG. 8).

In some demonstrative aspects, the plurality of RFICs 920 may be operable to form a radar antenna array including one or more Tx antenna arrays and one or more Rx antenna arrays.

For example, the plurality of RFICs 920 may be operable to form MIMO radar antenna 881 (FIG. 8) including Tx arrays 824 (FIG. 8), and/or Rx arrays 826 (FIG. 8).

In some demonstrative aspects, the plurality of RH radar devices 910 may be installed, for example, as integrated units around vehicle 900, for example, in the front, the rear, and/or corners of vehicle 900. For example, the plurality of RH radar devices 910 may be installed at a low position, e.g., at a bumper level of a bumper of vehicle 900, and/or or at a high position, e.g., on top of the vehicle 900, for example, on a roof of the vehicle.

In one example, radar devices may be positioned at dedicated high positions on vehicle 900, for example, to allow long-range detection and/or a clear Field of View (FoV).

Referring back to FIG. 8, in some demonstrative aspects, radar antenna 881 may include at least one polarized antenna, e.g., as described below.

In some demonstrative aspects, the plurality of Tx antennas 814 may include at least one polarized antenna; and/or the plurality of Rx antennas 816 may include at least one polarized antenna, e.g., as described below.

In some demonstrative aspects, one or more of, e.g., some or all of, the plurality of Tx antennas 814 may be implemented by at least one polarized antenna including a plurality of antenna elements, for example, sub-antenna elements, e.g., as described below.

In some demonstrative aspects, one or more of, e.g., some or all of, the plurality of Rx antennas 816 may be implemented by at least one polarized antenna including a plurality of antenna elements, for example, sub-antenna elements, e.g., as described below.

In some demonstrative aspects, a polarized antenna may include a plurality of sub-antenna elements, which may be connected to form, function, and/or operate as, a combined, e.g., a single, high-gain antenna, for example, to provide a technical solution to support a high gain of a radar antenna.

In some demonstrative aspects, a polarized antenna may include a horizontally polarized antenna, e.g., as described below.

For example, a horizontal direction may be defined with respect to the ground. In one example, a horizontal direction may be defined with respect to a road, e.g., in case of a polarized antenna implemented by a vehicle. For example, the horizontal polarization may be in a plane parallel to the horizon, e.g., parallel to the road.

In some demonstrative aspects, a horizontally polarized antenna may be configured to provide a technical solution for automotive radar devices, e.g., as described below.

In some demonstrative aspects, a horizontally polarized antenna may be configured to provide a technical solution to support placing of an automotive radar device behind a car bumper, e.g., as described below.

In one example, an automotive radar device may be located behind the car bumper, for example, in order to have minimal effect on a car appearance, e.g., on a vehicle exterior appearance.

In some demonstrative aspects, the horizontally polarized antenna may be configured to provide a technical solution to support wide field of view angles.

In one example, it may be advantageous to implement a horizontally polarized antenna for a radar device, for example, compared to a vertically polarized antenna, for example, when the antenna is to be placed behind a car bumper.

For example, a horizontally polarized antenna may provide improved performance at wide Field of View (FoV) angles, e.g., compared to a vertically polarized antenna, for example, in case of radar devices where the antenna may be covered with one or more bumper layers.

In some demonstrative aspects, a horizontally polarized antenna may be configured to provide a technical solution to support lower attenuation at large FoV angles, for example, compared to a vertically polarized antenna, for example, in cases when the radar antenna is to be located behind a car bumper.

In one example, it may be shown, for example, using Fresnel reflection coefficients, that a horizontally polarized antenna may achieve lower attenuation at large FoV angles, e.g., compared to a vertically polarized antenna, for example, in cases when the radar antenna is to be located behind a car bumper.

In some demonstrative aspects, a polarized antenna, e.g., a horizontally polarized antenna, may be positioned behind a car bumper, e.g., as described above. In other aspects, the polarized antenna, e.g., the horizontally polarized antenna, may be positioned behind a car fascia, a radome, a vehicle body, a panel, and/or any other element and/or position of the vehicle.

In some demonstrative aspects, there may be one or more technical problems, disadvantages, and/or inefficiencies in an implementation of a polarized antenna utilizing parallel feeding ("parallel-fed polarized antenna"), e.g., as described below.

In one example, a parallel-fed polarized antenna may have a relatively large area, which may be consumed by a parallel feeding network to feed antenna elements of the parallel-fed polarized antenna.

Figure 10:
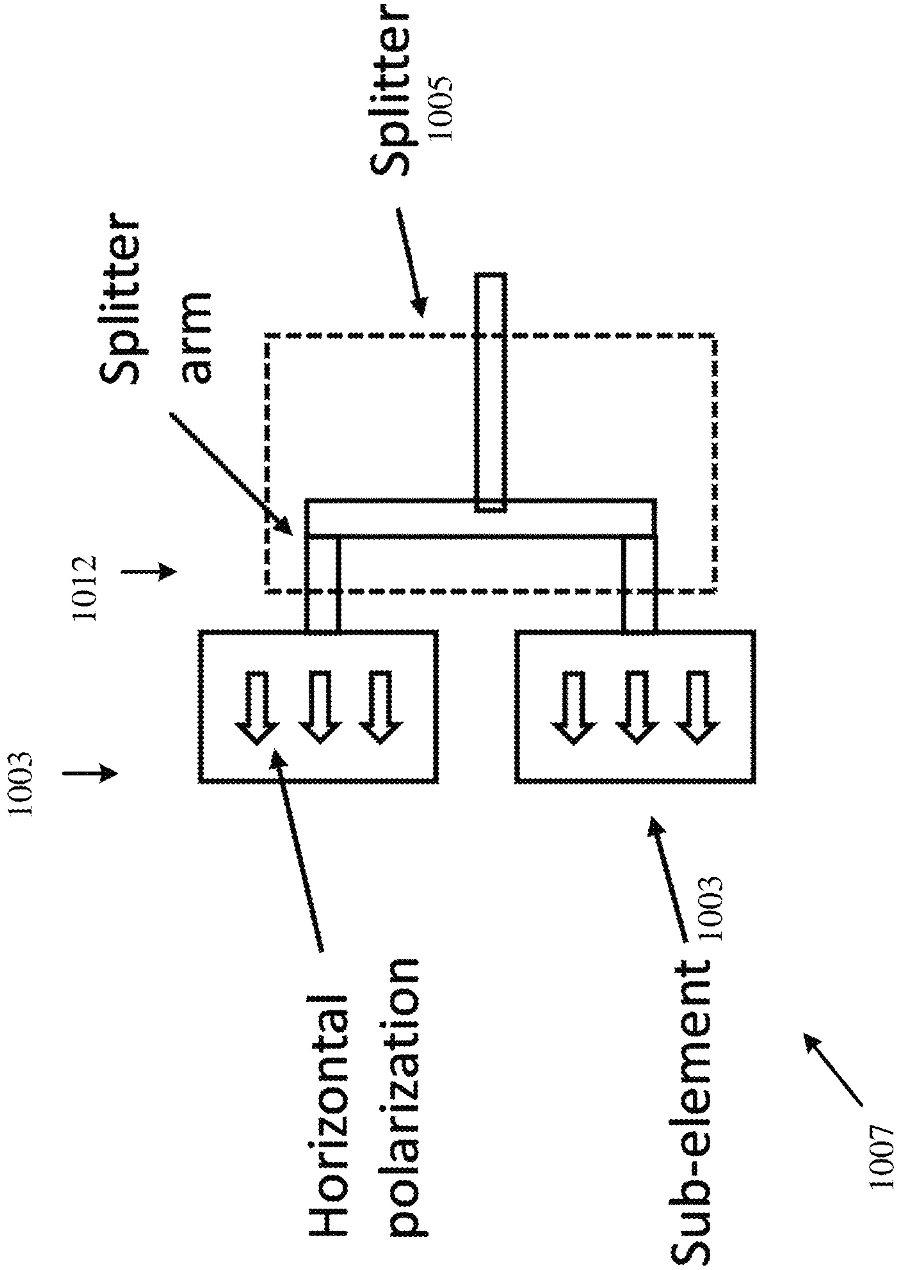
FIG. 10 is a schematic illustration of a parallel-fed polarized antenna, to demonstrate one or more technical issues, which may be addressed in accordance with some demonstrative aspects.

Reference is made to FIG. 10, which schematically illustrates a parallel-fed polarized antenna 1007, to demonstrate one or more technical issues, which may be addressed in accordance with some demonstrative aspects.

As shown in FIG. 10, parallel-fed polarized antenna 1007 may include a parallel feeding mechanism.

As shown in FIG. 10, parallel-fed polarized antenna 1007 may include a splitter 1005, e.g., a 1-to-2 splitter, including a plurality of arms 1012, e.g., two arms.

As shown in FIG. 10, parallel-fed polarized antenna 1007 may include a plurality of antenna sub-elements 1003, e.g., two antenna sub-elements.

As shown in FIG. 10, an antenna sub-element 1003, e.g., each antenna sub-element 1003, of parallel-fed polarized antenna 1007 may be fed directly and/or independently by one arm of the plurality of splitter arms 1012 of splitter 1005.

As shown in FIG. 10, the implementation of the splitter 1005 and the plurality of splitter arms 1012 may result in an enlarged effective area of parallel-fed polarized antenna 1007.

In one example, the enlarged effective area of parallel-fed polarized antenna 1007 may lead, for example, in some use cases, to severe design limitations, for example, when dense arrays with multiple antennas are utilized.

For example, area resources of devices for high frequency applications, which may operate around 80 GHZ, e.g., mmWave automotive radars, may be extremely limited.

For example, in some cases, a spacing between antennas may be configured to be less than 2 mm, for example, to realize half wavelength spaced arrays. Accordingly, reduction of a feeding network area, for example, even by less than half of a millimeter, may provide a significant advantage.

In some demonstrative aspects, there may be one or more technical problems, disadvantages, and/or inefficiencies in an implementation of a parallel-fed polarized antenna including a parallel feeding network implemented on a large number of separate layers.

In one example, the parallel feeding network may occupy less space, e.g., when implemented on a large number of separate layers. However, implementing the parallel feeding network on the large number of separate layers may add complexity, thickness, and/or cost to the parallel-fed polarized antenna.

For example, a parallel-fed polarized antenna utilizing a multilayer package, for example, a package with 3 or more layers, e.g., a 6-layer package, technology may allow to overcome area limitations, e.g., by realizing a feeding network on internal layers of a multilayer package, e.g., a 6-layer package, for example, at an expense of high cost and/or high structure complexity.

In some demonstrative aspects, there may be one or more technical problems, disadvantages, and/or inefficiencies in an implementation of a polarized antenna utilizing an end-fed serial feeding ("end-serial-fed polarized antenna" or "end-fed series-fed polarized antenna"), e.g., as described below.

In one example, an end-serial-fed polarized antenna may suffer from a narrow bandwidth and/or a narrow beamwidth, e.g., as described below.

Figure 11:
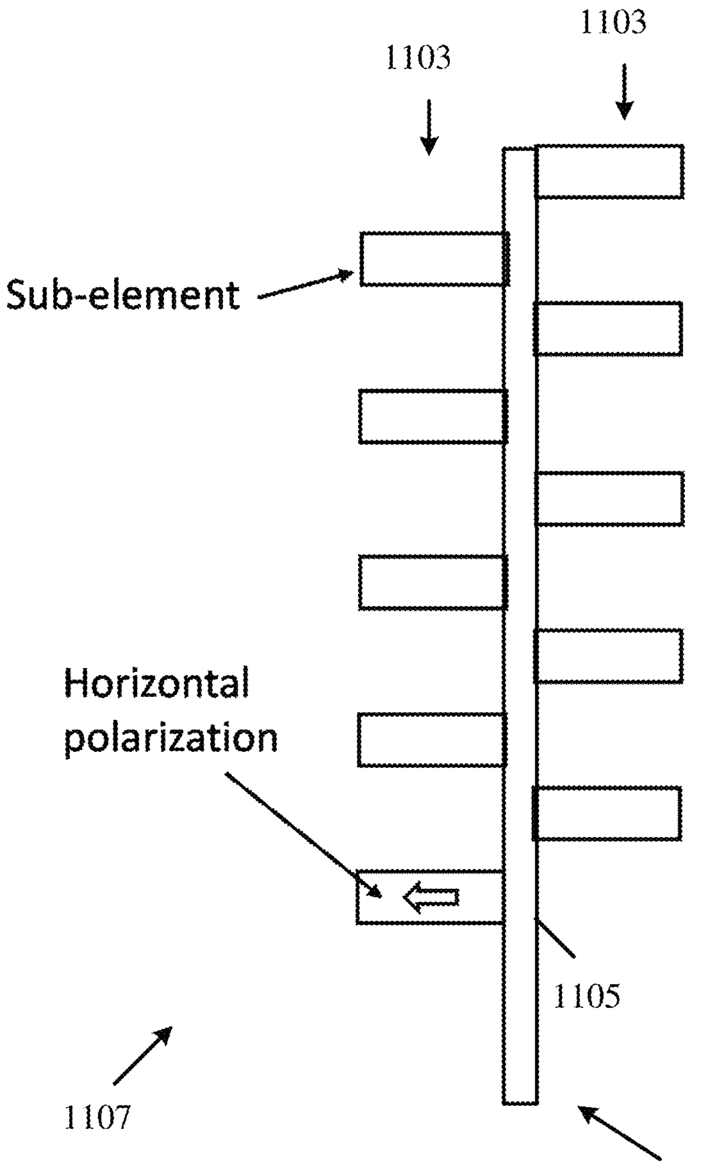
FIG. 11 is a schematic illustration of an end-serial-fed polarized antenna, to demonstrate one or more technical issues, which may be addressed in accordance with some demonstrative aspects.

Reference is made to FIG. 11, which schematically illustrates an end-serial-fed polarized antenna 1107, to demonstrate one or more technical issues, which may be addressed in accordance with some demonstrative aspects.

As shown in FIG. 11, end-serial-fed polarized antenna 1107 may include an end-fed comb-line structure in a series feeding configuration.

As shown in FIG. 11, end-serial-fed polarized antenna 1107 may include a plurality of antenna sub-elements 1103.

As shown in FIG. 11, all sub-elements 1103 of end-serial-fed polarized antenna 1107 may share a single feeding arm 1105.

As shown in FIG. 11, end-serial-fed polarized antenna 1107 may be fed from an end 1117 of the single feeding arm 1105.

In one example, the end-fed comb-line structure of end-serial-fed polarized antenna 1107 may be efficient, for example, when utilizing a relatively large number of sub-elements 1103, e.g., implemented as teeth-like sub elements.

However, the end-fed comb-line structure of end-serial-fed polarized antenna 1107 may result in a relatively long antenna having a narrow elevation beamwidth.

For example, in some implementations, e.g., radar implementations, a wide elevation beamwidth may be advantageous over a narrow elevation beamwidth.

In one example, a narrow elevation beamwidth may not be suitable for some radar implementations, for example, for identifying targets ("high targets"), which may be relatively high, and/or targets ("low targets"), which may be relatively low. For example, the high targets may include high bridges and/or the like, and/or the low targets may include low sidewalks, hazards on the road, and/or the like.

For example, in some implementations, e.g., radar implementations, support of a wide frequency bandwidth may be advantageous over a narrow frequency bandwidth.

For example, configuring an antenna to support a narrow frequency bandwidth, e.g., a 76-77 GHz frequency bandwidth, may not be sufficient to support some radar operation modes.

For example, some radar devices may be configured to cover a relatively wide frequency bandwidth, e.g., an entire 76-81 GHz frequency band, for example, in order to support a plurality of radar operation modes, e.g., including a Short Range Radar (SRR) mode, a Medium Range Radar (MRR) mode, and/or a Long Range Radar (LRR) mode.

In another example, the end-fed comb-line structure of end-serial-fed polarized antenna 1107 may suffer from beam squint along elevation angles, for example, with a change in frequency.

Referring back to FIG. 8, in some demonstrative aspects, device 802 may implement a polarized antenna, e.g., a horizontally polarized antenna, which may be configured according to an antenna feeding mechanism (also referred to as a "twisted series feeding" mechanism), which may be configured to utilize a twisted serial-feeding mechanism, e.g., as described below.

In some demonstrative aspects, the twisted series mechanism may be configured to utilize a centralized and twisted antenna feeding network, e.g., as described below.

In some demonstrative aspects, the polarized antenna may be configured to provide a technical solution to support a compact size, e.g., compared to a parallel-fed polarized antenna.

In some demonstrative aspects, the polarized antenna may be configured to provide a technical solution to support a wide bandwidth and/or a wide beamwidth, e.g., compared to an end-serial-fed polarized antenna.

In some demonstrative aspects, the polarized antenna may be configured to provide a technical solution to support radar devices for various automotive radar products, e.g., as described below.

In some demonstrative aspects, the polarized antenna may be configured to provide a technical solution to support radar devices implementing antennas located behind car bumpers, a car fascia, a radome, a vehicle body, a panel, and/or any other element and/or position of the vehicle, e.g., as described below.

In some demonstrative aspects, the polarized antenna may be configured to provide a technical solution to support low-cost and/or high-performance radar devices, for example, even for implementations utilizing antennas located behind a car bumper, a car fascia, a radome, a vehicle body, a panel, and/or any other element and/or position of the vehicle.

In some demonstrative aspects, the polarized antenna may be configured to provide a technical solution to support a wide bandwidth and/or a wide beamwidth, for example, in contrast to the end-serial-fed polarized antenna, which may suffer from a narrow beamwidth and/or a narrow bandwidth.

In some demonstrative aspects, the polarized antenna may be configured to provide a technical solution to support implementation of antennas on a low-cost Printed Circuit Board (PCB) having a relatively small number of layers, for example, compared to a multilayer package, e.g., a 6-layer package, for supporting parallel-fed polarized antennas.

In some demonstrative aspects, the polarized antenna may include a metal layer including a plurality of antenna sub-elements, which may be connected together using a twisted feeding network, for example, a center-fed ("centralized") twisted feeding network, e.g., as described below.

In some demonstrative aspects, the twisted feeding network may be configured to provide a technical solution to reduce an area of the polarized antenna, e.g., as described below.

In some demonstrative aspects, the twisted feeding network may be configured to provide a technical solution to reduce a number of layers of the polarized antenna, e.g., as described below.

In some demonstrative aspects, the twisted feeding network may be located, for example, directly in antenna layers of the polarized antenna, e.g. directly in the metal layer including the plurality of antenna sub-elements, as described below.

In some demonstrative aspects, the twisted feeding network may be configured, for example, such that an area of the twisted feeding network may sustainably not exceed an area of the plurality of antenna sub-elements.

For example, this configuration of the twisted feeding network may provide a technical solution, which may reduce an area occupied by the polarized antenna.

For example, this configuration of the twisted feeding network may provide a technical solution to support a reduced number of layers occupied by the polarized antenna.

In some demonstrative aspects, the twisted feeding network may be configured to provide a technical solution to effectively create a compact series feeding mechanism, e.g., as described below.

In some demonstrative aspects, the polarized antenna may be configured to provide a technical solution to support a wide bandwidth, for example, to support a plurality of, e.g., some or all, radar operation modes of a radar device, e.g., the LRR mode, the MRR mode, and/or the SRR mode.

In some demonstrative aspects, the polarized antenna may be configured to provide a technical solution to support a wide elevation beamwidth, for example, to support detection of elements, e.g., high targets, which are located high above a vehicle, e.g., bridges and/or the like, and/or elements, e.g., low targets, which are located lower than the vehicle, e.g., hazards on the road and/or the like.

Figure 12:
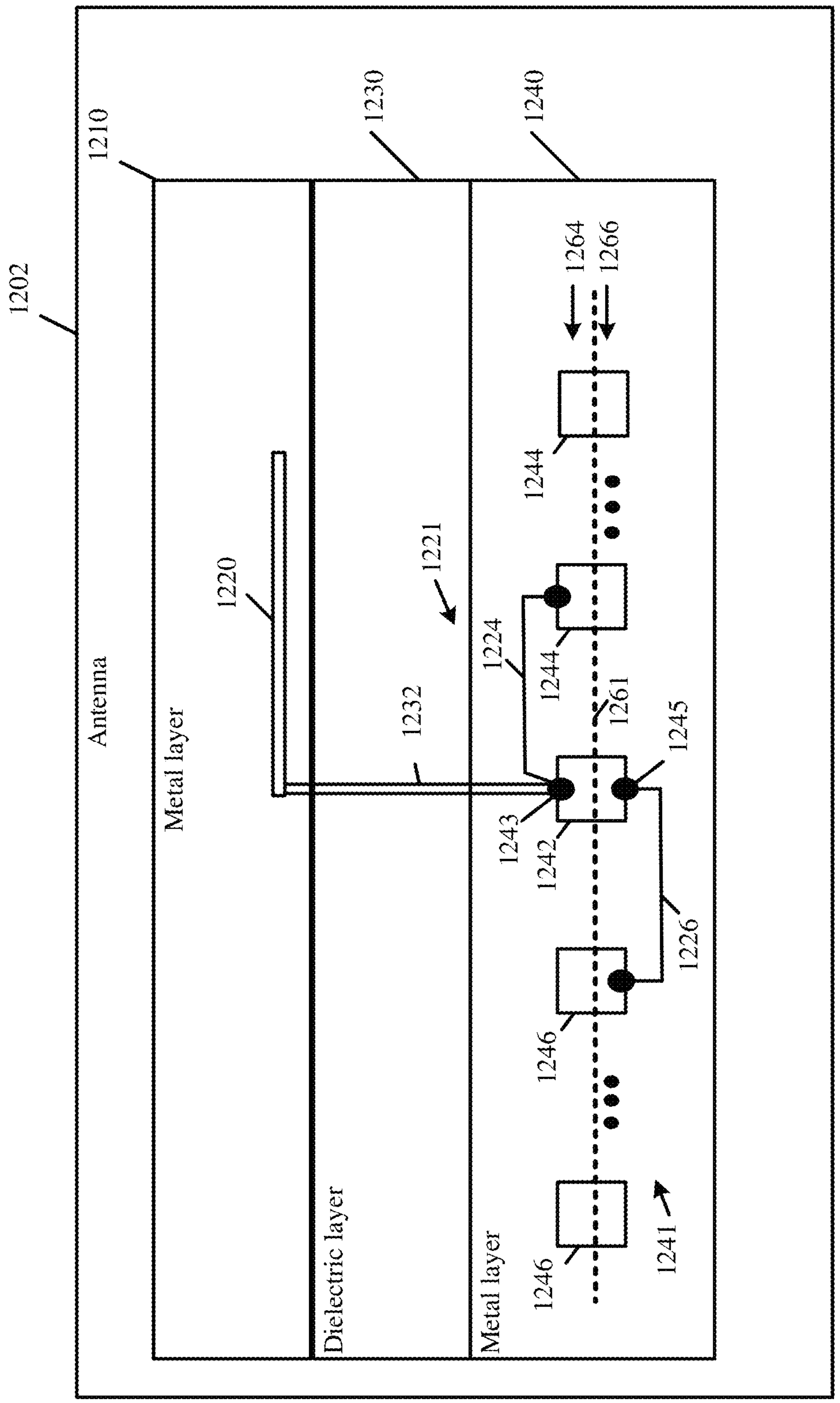
FIG. 12 is a schematic illustration of a polarized antenna, in accordance with some demonstrative aspects.

Reference is made to FIG. 12, which schematically illustrates a polarized antenna 1202, in accordance with some demonstrative aspects.

In some demonstrative aspects, as shown in FIG. 12, polarized antenna 1202 may include a horizontally polarized antenna, e.g., as described below.

In other aspects, polarized antenna 1202 may include any other type of polarized antenna.

In some demonstrative aspects, radar antenna 881 (FIG. 8) may include at least one polarized antenna 1202, e.g., as described below.

In some demonstrative aspects, the plurality of Tx antennas 814 (FIG. 8) and/or and the plurality of Rx antennas 816 (FIG. 8) may include at least one polarized antenna 1202, e.g., as described below.

In some demonstrative aspects, the plurality of Tx antennas 814 (FIG. 8) may include a plurality of Tx polarized antennas 1202, e.g., as described below.

In some demonstrative aspects, for example, each Tx antenna of the plurality of Tx antennas 814 (FIG. 8) may include a polarized antenna 1202.

In other aspects, only some Tx antennas of the plurality of Tx antennas 814 (FIG. 8) may include a polarized antenna 1202, while one or more other Tx antennas of the plurality of Tx antennas 814 (FIG. 8) may include any other types of antennas.

In some demonstrative aspects, the plurality of Rx antennas 816 (FIG. 8) may include a plurality of Rx polarized antennas, e.g., as described below.

In some demonstrative aspects, for example, each Rx antenna of the plurality of Rx antennas 816 (FIG. 8) may include a polarized antenna 1202.

In other aspects, only some Rx antennas of the plurality of Rx antennas 816 (FIG. 8) may include a polarized antenna 1202, while one or more other Rx antennas of the plurality of Rx antennas 816 (FIG. 8) may include any other types of antennas.

In some demonstrative aspects, polarized antenna 1202 may be configured to communicate RF signals at a frequency above 70 GHz, e.g., as described below.

In other aspects, polarized antenna 1202 may be configured to communicate RF signals in any other frequency.

In some demonstrative aspects, polarized antenna 1202 may be configured to communicate RF signals in a frequency bandwidth of 76-81 GHz, e.g., as described below.

In other aspects, polarized antenna 1202 may be configured to communicate RF signals in any other suitable frequency bandwidth.

In some demonstrative aspects, polarized antenna 1202 may be implemented as part of a radar device or system, for example, as part of radar device 800 (FIG. 8), e.g., as described above.

In some demonstrative aspects, polarized antenna 1202 may be implemented as part of any other suitable device and/or system.

For example, in some demonstrative aspects, polarized antenna 1202 may be implemented as part of a device, for example, a mobile device, a computing device, and/or a wireless communication device, for example, to communicate RF wireless communication signals.

For example, in some demonstrative aspects, polarized antenna 1202 may be implemented to communicate the RF wireless communication signals over mmWave frequencies.

In some demonstrative aspects, polarized antenna 1202 may be configured to implement a twisted feeding network, for example, a centralized and twisted feeding network, e.g., as described below.

In some demonstrative aspects, as shown in FIG. 12, polarized antenna 1202 may include a dielectric layer 1230, e.g., as described below.

In some demonstrative aspects, as shown in FIG. 12, dielectric layer 1230 may include an antenna via 1232, e.g., as described below.

In some demonstrative aspects, as shown in FIG. 12, polarized antenna 1202 may include a first metal layer 1210 on a first side of the dielectric layer 1230, e.g., as described below.

In some demonstrative aspects, as shown in FIG. 12, first metal layer 1210 may include an antenna feeding trace 1220, e.g., as described below.

In some demonstrative aspects, as shown in FIG. 12, antenna feeding trace 1220 may be configured to feed antenna elements of the polarized antenna 1202, e.g., as described below.

In some demonstrative aspects, as shown in FIG. 12, antenna feeding trace 1220 may be connected to a first end of the antenna via 1232, e.g., as described below.

In some demonstrative aspects, as shown in FIG. 12, polarized antenna 1202 may include a second metal layer 1240 on a second side of the dielectric layer 1230, for example, opposite to the first side of the dielectric layer 1230, e.g., as described below.

In some demonstrative aspects, as shown in FIG. 12, the second metal layer 1240 may include a plurality of antenna elements 1241, e.g., as described below.

In some demonstrative aspects, as shown in FIG. 12, the plurality of antenna elements 1241 may include at least a first antenna element 1244, a second antenna element 1246, and a third antenna element 1242, e.g., as described below.

In other aspects, the plurality of antenna elements 1241 may include any other count of antenna elements.

In some demonstrative aspects, as shown in FIG. 12, the third antenna element 1242 may be connected to a second end of the antenna via 1232, e.g., as described below.

In some demonstrative aspects, as shown in FIG. 12, the second metal layer 1240 may include a plurality of antenna traces 1221 serially connecting the plurality of antenna elements 1241, e.g., as described below.

In some demonstrative aspects, as shown in FIG. 12, the plurality of antenna traces 1221 may include at least a first antenna trace 1224 and/or a second antenna trace 1226, e.g., as described below.

In other aspects, the plurality of antenna traces 1221 may include any other count of antenna traces.

In some demonstrative aspects, as shown in FIG. 12, the first antenna trace 1224 may connect the first antenna element 1244 to a first side of the third antenna element 1242, for example, on a first side 1264 of an axis 1261 via the plurality of antenna elements 1241, e.g., as described below.

In some demonstrative aspects, as shown in FIG. 12, the second antenna trace 1226 may connect the second antenna element 1246 to a second side of the third antenna element 1242, for example, on a second side 1266 of the axis 1261 via the plurality of antenna elements 1241, e.g., as described below.

In some demonstrative aspects, as shown in FIG. 12, the first antenna trace 1224, e.g., substantially an entirety of the first antenna trace 1224, may be on the first side 1264 of the axis 1261, e.g., as described below.

In some demonstrative aspects, as shown in FIG. 12, the second antenna trace 1226, e.g., substantially an entirety of the second antenna trace 1226, may be on the second side 1266 of the axis 1261, e.g., as described below.

In some demonstrative aspects, as shown in FIG. 12, a length of the first antenna trace 1224 may be substantially equal to, or an integer multiple of, a length of the second antenna trace 1226, e.g., as described below.

In some demonstrative aspects, as shown in FIG. 12, the first antenna trace 1224 may connect the first side of the third antenna element 1242 to a side of the first antenna element 1244, which may be on the first side 1264 of the axis 1261, e.g., as described below.

In some demonstrative aspects, as shown in FIG. 12, the second antenna trace 1226 may connect the second side of the third antenna element 1242 to a side of the second antenna element 1246, which may be on the second side 1266 of the axis 1261, e.g., as described below.

In some demonstrative aspects, as shown in FIG. 12, an end of the first antenna trace 1224 may be connected to a center portion 1243 of the first side of the third antenna element 1242, e.g., as described below.

In some demonstrative aspects, as shown in FIG. 12, an end of the second antenna trace 1226 may be connected to a center portion 1245 of the second side of the third antenna element 1242, e.g., as described below.

In some demonstrative aspects, as shown in FIG. 12, the second end of the antenna via 1232 may be connected to the center portion 1243 of the first side of the third antenna element 1242, e.g., as described below.

In other aspects, the second end of the antenna via 1232 may be connected to the center portion 1245 of the second side of the third antenna element 1242, e.g., as described below.

In some demonstrative aspects, as shown in FIG. 12, the antenna via 1232 may be directly above the center portion 1243 of the first side of the third antenna element 1242, e.g., as described below.

In other aspects, the antenna via 1232 may be directly above the center portion 1245 of the second side of the third antenna element.

In some demonstrative aspects, the first antenna trace 1224 and the second antenna trace 1226 may be configured, for example, such that for first, second, and third signals simultaneously communicated via the first antenna element 1244, the second antenna element 1246, and the third antenna element 1242, respectively, a phase of each of the first, second, and third signals may be substantially equal to a particular phase, or may be an integer multiple of 360 degrees from the particular phase, e.g., as described below.

In some demonstrative aspects, the plurality of antenna traces 1221 may be configured, for example, such that an antenna matching of the polarized antenna 1202 may not be greater than-10 decibel milliwatts (dBm), for example, for substantially any RF signal in a frequency bandwidth of 76-81 GHz, e.g., as described below.

In other aspects, the plurality of antenna traces 1221 may be configured, for example, such that the antenna matching of the polarized antenna 1202 may be configured according to any other antenna matching limitation and/or for any other frequency bandwidth.

In some demonstrative aspects, the plurality of antenna elements 1241 may include one or more patch antenna elements, e.g., as described below.

In other aspects, the plurality of antenna elements 1241 may include any other type of antenna elements.

Figure 13:
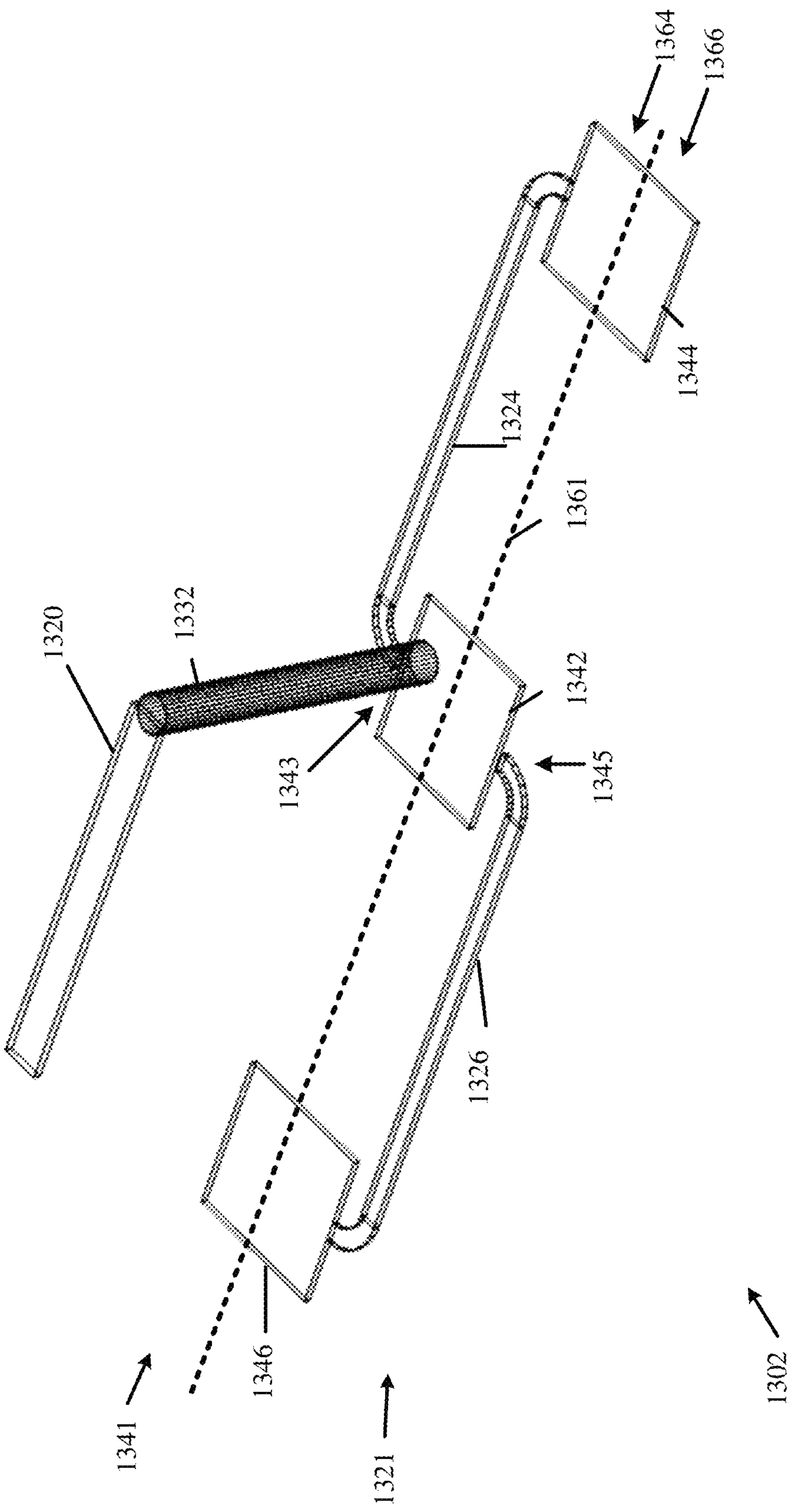
FIG. 13 is a schematic illustration of elements of a polarized antenna, in accordance with some demonstrative aspects.

Reference is made to FIG. 13, which schematically illustrates elements of a polarized antenna 1302, in accordance with some demonstrative aspects. For example, polarized antenna 1202 (FIG. 12) may include one or more elements of polarized antenna 1302, and/or may perform the functionally of polarized antenna 1302.

In one example, FIG. 13 illustrates a three-dimensional (3D) isometric view of the polarized antenna 1302.

In some demonstrative aspects, as shown in FIG. 13, polarized antenna 1302 may include a horizontally polarized antenna.

In other aspects, polarized antenna 1302 may include any other type of polarized antenna.

In some demonstrative aspects, as shown in FIG. 13, polarized antenna 1302 may include an antenna feeding trace 1320.

In some demonstrative aspects, as shown in FIG. 13, antenna feeding trace 1320 may be configured to feed the polarized antenna 1302.

In some demonstrative aspects, as shown in FIG. 13, antenna feeding trace 1320 may be connected to a first end of an antenna via 1332.

In some demonstrative aspects, as shown in FIG. 13, polarized antenna 1302 may include a plurality of antenna elements 1341, e.g., as described below.

In some demonstrative aspects, as shown in FIG. 13, the plurality of antenna elements 1341 may include a first antenna element 1344, a second antenna element 1346, and a third antenna element 1342.

In other aspects, the plurality of antenna elements 1341 may include any other count of antenna elements.

In some demonstrative aspects, as shown in FIG. 13, the third antenna element 1342 may be connected to a second end of the antenna via 1332.

In some demonstrative aspects, as shown in FIG. 13, polarized antenna 1302 may include a plurality of antenna traces 1321 serially connecting the plurality of antenna elements 1341.

In some demonstrative aspects, as shown in FIG. 13, the plurality of antenna traces 1321 may include a first antenna trace 1324 and/or a second antenna trace 1326.

In other aspects, the plurality of antenna traces may include any other count of antenna traces.

In some demonstrative aspects, as shown in FIG. 13, the first antenna trace 1324 may connect the first antenna element 1344 to a first side of the third antenna element 1342, for example, on a first side 1364 of an axis 1361 via the plurality of antenna elements 1341.

In some demonstrative aspects, as shown in FIG. 13, the second antenna trace 1326 may connect the second antenna element 1346 to a second side of the third antenna element 1342, for example, on a second side 1366 of the axis 1361 via the plurality of antenna elements 1341.

In some demonstrative aspects, as shown in FIG. 13, the first antenna trace 1324, e.g., substantially an entirety of the first antenna trace 1324, may be on the first side 1364 of the axis 1361, e.g., as described below.

In some demonstrative aspects, as shown in FIG. 13, the second antenna trace 1326, e.g., substantially an entirety of the second antenna trace 1326, may be on the second side 1366 of the axis 1361, e.g., as described below.

In some demonstrative aspects, as shown in FIG. 13, a length of the first antenna trace 1324 may be substantially equal to, or an integer multiple of, a length of the second antenna trace 1326, e.g., as described below.

In some demonstrative aspects, as shown in FIG. 13, the first antenna trace 1324 may connect the first side of the third antenna element 1342 to a side of the first antenna element 1344, which may be on the first side 1364 of the axis 1361.

In some demonstrative aspects, as shown in FIG. 13, the second antenna trace 1326 may connect the second side of the third antenna element 1342 to a side of the second antenna element 1346, which may be on the second side 1366 of the axis 1361.

In some demonstrative aspects, as shown in FIG. 13, an end of the first antenna trace 1324 may be connected to a center portion 1343 of the first side of the third antenna element 1342.

In some demonstrative aspects, as shown in FIG. 13, an end of the second antenna trace 1326 may be connected to a center portion 1345 of the second side of the third antenna element 1342, e.g., as described below.

In some demonstrative aspects, as shown in FIG. 13, the second end of the antenna via 1332 may be connected to the center portion 1343 of the first side of the third antenna element 1342, e.g., as described below.

In other aspects, the second end of the antenna via 1332 may be connected to the center portion 1345 of the second side of the third antenna element 1342.

In some demonstrative aspects, as shown in FIG. 13, the antenna via 1332 may be substantially directly above the center portion 1343 of the first side of the third antenna element 1342, e.g., as described below.

In other aspects, the antenna via 1332 may be substantially directly above the center portion 1345 of the second side of the third antenna element.

In some demonstrative aspects, the first antenna trace 1324 and the second antenna trace 1326 may be configured, for example, such that for first, second and third signals simultaneously communicated via the first antenna element 1342, the second antenna element 1344, and the third antenna element 1346, respectively, a phase of each of the first, second and third signals may be substantially equal to a particular phase, or may be an integer multiple of 360 degrees from the particular phase.

In one example, the plurality of antenna elements 1341 may be connected in series and may be center-fed, e.g., according to a series center-fed mechanism. For example, the phases of signals via the plurality of antenna elements 1341 may be equal to substantially the same phase or may have an integer multiple of 360 degrees from the same phase.

In some demonstrative aspects, as shown in FIG. 13, polarized antenna 1302 may be configured to provide a technical solution to support an implementation of a polarized antenna occupying less space and/or less layers, for example, compared to parallel-fed polarized antennas.

In some demonstrative aspects, polarized antenna 1302 may be configured to provide a technical solution to support achieving a wide beamwidth and/or a wide bandwidth, for example, without squinting along the elevation angles, e.g., compared to end-serial-fed polarized antennas.

In some demonstrative aspects, as shown in FIG. 13, the antenna feeding trace 1320 may be on a top layer of polarized antenna 1302, e.g., in the metal layer 1210 (FIG. 12).

In some demonstrative aspects, as shown in FIG. 13, the antenna feeding trace 1320 may be connected, e.g., using antenna via 1332, to the third antenna element 1342, for example, a middle sub-element, on a bottom layer of polarized antenna 1302, e.g., the metal layer 1240 (FIG. 12).

In some demonstrative aspects, as shown in FIG. 13, polarized antenna 1302 may be configured to implement a functionality of a centralized feeding network. For example, as shown in FIG. 13, the feeding trace 1320 may enter, e.g., using the antenna via 1332, to a center of an antenna structure of polarized antenna 1302, e.g., to the third antenna element 1342.

In some demonstrative aspects, the centralized network may be configured to provide a technical solution to support a beam, which may not be substantially squinted along elevation angles, for example, over frequency changes, e.g., compared to end-serial-fed polarized antennas.

In some demonstrative aspects, as shown in FIG. 13, one or more, e.g., some or all, edge sub-elements of polarized antenna 1302 may be connected using traces, for example, in the bottom antenna layer of polarized antenna 1302, to the middle sub-element.

In one example, first antenna element 1344 may be connected to the third antenna element 1342, e.g., via first antenna trace 1324, for example, in metal layer 1240 (FIG. 12).

In another example, second antenna element 1344 may be connected to the third antenna element 1342, e.g., via second antenna trace 1326 for example, in metal layer 1240 (FIG. 12).

In some demonstrative aspects, as shown in FIG. 13, polarized antenna 1302 may be configured to provide a functionality of a twisted feeding network, in which first antenna trace 1324 and second antenna trace 1326 may be connected from opposite sides of the third antenna element 1342, to connect, e.g., in a twisted manner, the third antenna element 1342 to the edge sub elements of the polarized antenna 1302.

In one example, as shown in FIG. 13, first antenna trace 1324 may be connected to the first side of third antenna element 1342, and may be twisted to connect to the first antenna element 1344, e.g., to the side of the first antenna element 1344, which is on the first side 1364 of the axis 1361.

In another example, as shown in FIG. 13, second antenna trace 1324 may be connected to the second side of third antenna element 1342, and may be twisted to connect to the second antenna element 1346, e.g., to the side of the second antenna element 1346, which is on the second side 1366 of the axis 1361.

In some demonstrative aspects, the twisted feeding network may be configured to provide a technical solution, for example, to stabilize a beam pattern of a beam of polarized antenna 1302.

In some demonstrative aspects, the twisted feeding network may be configured to provide a technical solution to support an improved antenna performance of polarized antenna 1302, for example, along a relatively wide frequency bandwidth, e.g., substantially the entire 76-81 GHz frequency band.

In some demonstrative aspects, as shown in FIG. 13, the antenna feeding trace 1320 may be configured, for example, such that the twisted feeding network may not sustainably enlarge the effective area of the plurality of the antenna elements 1341.

In some demonstrative aspects, the reduced size of the twisted feeding network may provide a technical solution to support a relatively thin antenna width, which may be, for example, suitable for realization of dense half-wavelength spaced arrays.

In some demonstrative aspects, polarized antenna 1302 may be configured to provide a technical solution to support a wide beamwidth and/or a wide bandwidth, for example, compared to end-serial-fed polarized antennas, which may support only a relatively narrow bandwidth and/or a relatively narrow beamwidth.

For example, polarized antenna 1302 may be configured to provide a technical solution to support utilizing a relatively small number of antenna sub-elements, for example, to achieve a relatively wide beamwidth and/or a relatively wide frequency bandwidth, for example, compared to end-serial-fed polarized antennas, which may utilize a large number of antenna sub-elements.

Referring back to FIG. 12, in some demonstrative aspects, the plurality of antenna elements 1241 may include more than three antenna elements, e.g., as describe below.

In some demonstrative aspects, as shown in FIG. 12, the plurality of antenna elements 1241 may include a plurality of first antenna elements 1244, e.g., as described below.

In some demonstrative aspects, the plurality of antenna traces 1221 may include a plurality of first antenna traces 1224 (not shown in FIG. 12), e.g., as described below.

In some demonstrative aspects, the plurality of first antenna traces 1224 may serially connect a side of the plurality of first antenna elements 1244, which may be on the first side 1264 of the axis 1261, to the first side of the third antenna element 1242, e.g., as described below.

In some demonstrative aspects, as shown in FIG. 12, the plurality of antenna elements 1241 may include a plurality of second antenna elements 1246, e.g., as described below.

In some demonstrative aspects, the plurality of antenna traces 1221 may include a plurality of second antenna traces 1226 (not shown in FIG. 12), e.g., as described below.

In some demonstrative aspects, the plurality of second antenna traces 1226 may serially connect a side of the plurality of second antenna elements 1246, which may be on the second side 1266 of the axis 1261, to the second side of the third antenna element 1242, e.g., as described below.

In some demonstrative aspects, a count of first antenna elements 1244 in the plurality of first antenna elements 1244 may be equal to a count of second antenna elements 1246 in the plurality of second antenna elements 1246, e.g., as described below with reference to FIG. 14.

In some demonstrative aspects, the plurality of first antenna elements 1244 may include three antenna elements 1244, and/or the plurality of second antenna elements 1246 may include three antenna elements 1246, e.g., as described below with reference to FIG. 14.

In some demonstrative aspects, the count of the first antenna elements 1244 in the plurality of first antenna elements 1244 may not be equal to the count of the second antenna elements 1246 in the plurality of second antenna elements 1246, e.g., as described below with reference to FIG. 15.

In some demonstrative aspects, the plurality of first antenna elements 1244 may include three antenna elements 1244, and the plurality of second antenna elements 1246 may include two antenna elements 1246, e.g., as described below with reference to FIG. 15.

In other aspects, the plurality of first antenna elements 1244 and/or the plurality of second antenna elements 1246 may include any other number of antenna elements.

Figure 14:
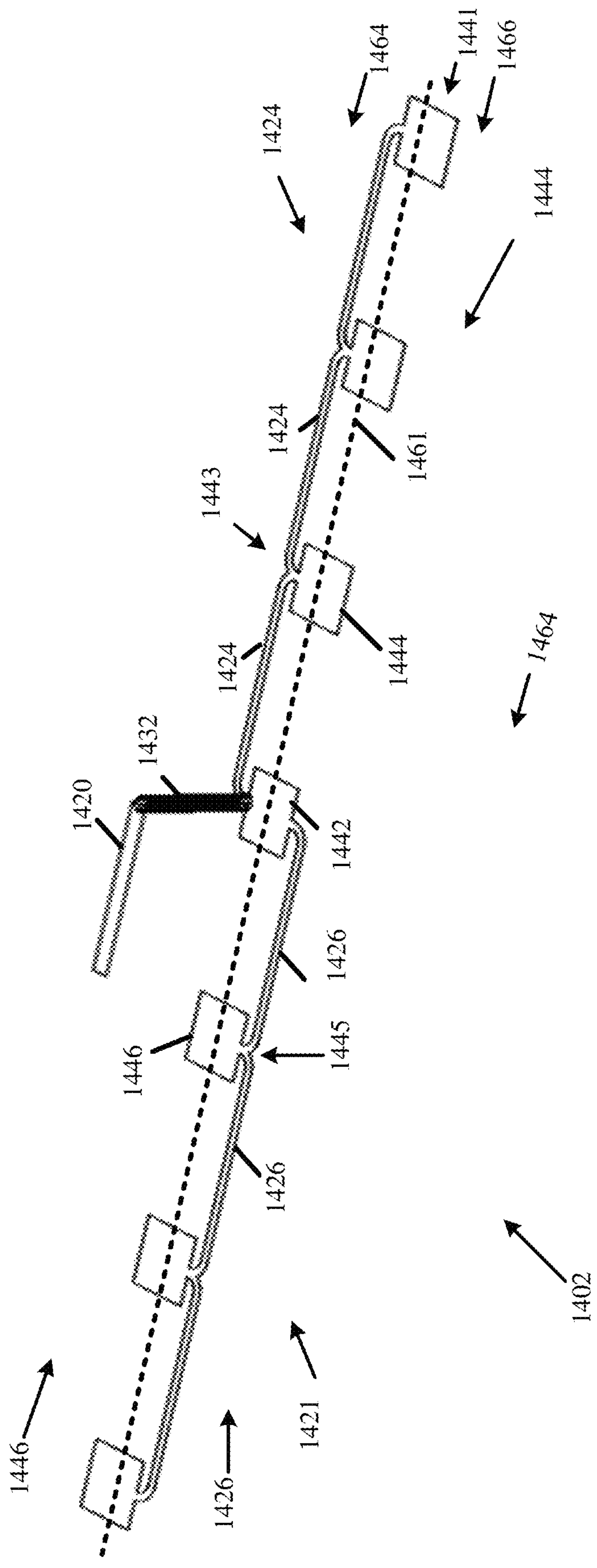
FIG. 14 is a schematic illustration of elements of a polarized antenna, in accordance with some demonstrative aspects.

Reference is made to FIG. 14, which schematically illustrates elements of a polarized antenna 1402, in accordance with some demonstrative aspects. For example, polarized antenna 1202 (FIG. 12) may include one or more elements of polarized antenna 1402, and/or may perform the functionally of polarized antenna 1402.

In one example, FIG. 14 illustrates a 3D isometric view of the polarized antenna 1402.

In some demonstrative aspects, as shown in FIG. 14, polarized antenna 1402 may include a horizontally polarized antenna.

In other aspects, polarized antenna 1402 may include any other type of polarized antenna.

In some demonstrative aspects, as shown in FIG. 14, polarized antenna 1402 may include an antenna feeding trace 1420.

In some demonstrative aspects, as shown in FIG. 14, antenna feeding trace 1420 may be configured to feed antenna elements of the polarized antenna 1402.

In some demonstrative aspects, as shown in FIG. 14, antenna feeding trace 1420 may be connected to a first end of an antenna via 1432.

In some demonstrative aspects, as shown in FIG. 14, polarized antenna 1402 may include a plurality of antenna elements 1441, e.g., as described below.

In some demonstrative aspects, as shown in FIG. 14, the plurality of antenna elements 1441 may include a plurality of first antenna elements 1444.

In some demonstrative aspects, as shown in FIG. 14, the plurality of antenna elements 1441 may include a plurality of second antenna elements 1446.

In some demonstrative aspects, as shown in FIG. 14, the plurality of antenna elements 1441 may include a third antenna element 1442.

In some demonstrative aspects, as shown in FIG. 14, the third antenna element 1442 may be connected to a second end of the antenna via 1432.

In some demonstrative aspects, as shown in FIG. 14, a count of first antenna elements 1444 in the plurality of first antenna elements 1444 may be equal to a count of second antenna elements 1446 in the plurality of second antenna elements 1446.

In some demonstrative aspects, as shown in FIG. 14, the plurality of first antenna elements 1444 may include three antenna elements 1444, and/or the plurality of second antenna elements 1446 may include three antenna elements 1446.

In other aspects, the plurality of first antenna elements 1444 and/or the plurality of second antenna elements 1446 may include any other count of antenna elements.

In some demonstrative aspects, as shown in FIG. 14, polarized antenna 1402 may include seven antenna elements, for example, including the three antenna elements 1444, the three antenna elements 1446, and the antenna element 1442, e.g., 3+3+1=7.

In other aspects, polarized antenna 1402 may include any other number of antenna elements, for example, based on gain, FoV requirements, and/or any other requirements and/or criteria.

In some demonstrative aspects, as shown in FIG. 14, polarized antenna 1402 may include a plurality of antenna traces 1421.

In some demonstrative aspects, as shown in FIG. 14, the plurality of antenna traces 1421 may include a plurality of first antenna traces 1424.

In some demonstrative aspects, as shown in FIG. 14, the plurality of antenna traces 1421 may include a plurality of second antenna traces 1426.

In some demonstrative aspects, as shown in FIG. 14, the plurality of first antenna traces 1424 may be on a first side 1464 of an axis 1461 via the plurality of antenna elements 1441.

In some demonstrative aspects, as shown in FIG. 14, the plurality of second antenna traces 1426 may be on a second side 1466 of the axis 1461 via the plurality of antenna elements 1441.

In some demonstrative aspects, as shown in FIG. 14, the plurality of first antenna traces 1424 may serially connect a side of the plurality of first antenna elements 1444, which may be on the first side 1464 of the axis 1461, to a first side of the third antenna element 1442, which may be on the first side 1464 of the axis 1461.

In some demonstrative aspects, as shown in FIG. 14, the plurality of second antenna traces 1426 may serially connect a side of the plurality of second antenna elements 1446, which may be on the second side 1466 of the axis 1461, to a second side of the third antenna element 1442, which may be on the second side 1466 of the axis 1461.

In some demonstrative aspects, as shown in FIG. 14, a pair of first antenna traces 1424 of the plurality of first antenna traces 1424 may be connected to a center portion 1443 of a side of the first antenna element 1444, which may be on the first side 1464 of the axis 1461.

In some demonstrative aspects, as shown in FIG. 14, a pair of second antenna traces 1426 of the plurality of second antenna traces 1426 may be connected to a center portion 1445 of a side of the second antenna element 1446, which may be on the second side 1466 of the axis 1461.

In some demonstrative aspects, as shown in FIG. 14, polarized antenna 1402 may be configured to provide a technical solution to support an increased number of antenna elements, e.g., seven antenna elements, for example, with substantially no enlargement of a width of the polarized antenna 1402, for example, compared to a width of polarized antenna 1302 (FIG. 13), which includes three antenna elements.

Figure 15:
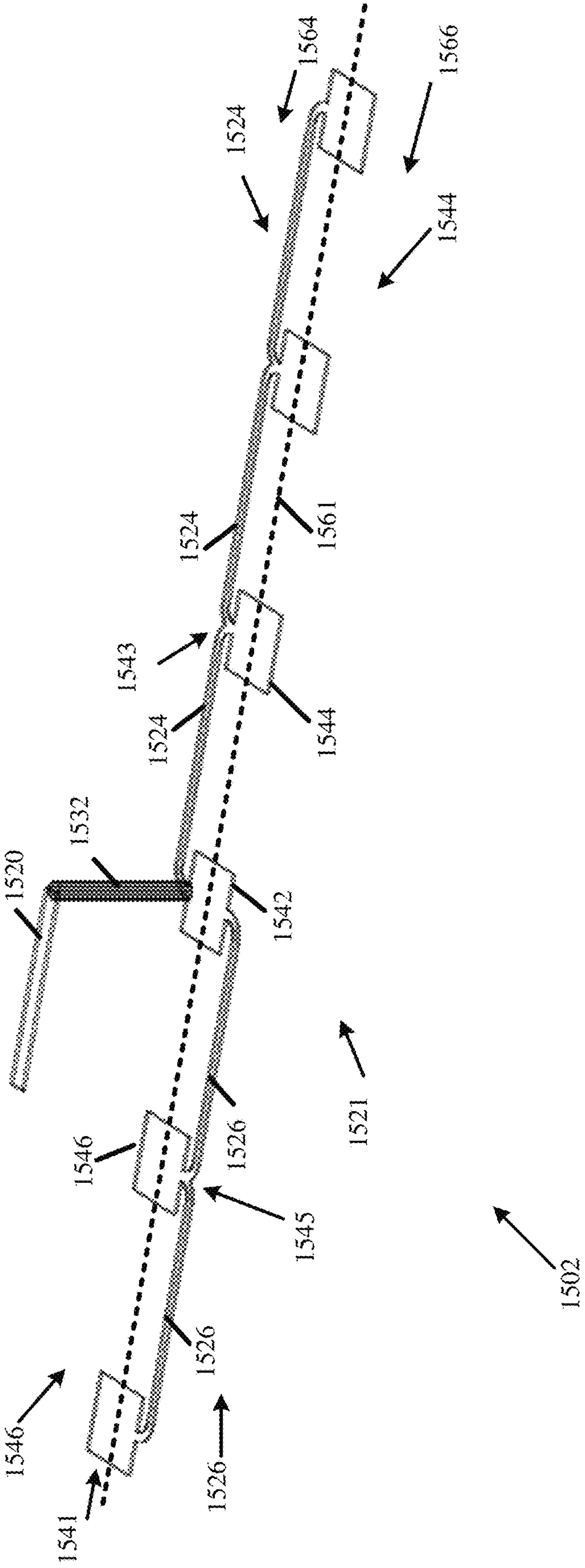
FIG. 15 is a schematic illustration of elements of a polarized antenna, in accordance with some demonstrative aspects.

Reference is made to FIG. 15, which schematically illustrates elements of a polarized antenna 1502, in accordance with some demonstrative aspects. For example, polarized antenna 1202 (FIG. 12) may include one or more elements of polarized antenna 1502, and/or may perform the functionally of polarized antenna 1502.

In one example, FIG. 15 illustrates a 3D isometric view of the polarized antenna 1502.

In some demonstrative aspects, as shown in FIG. 15, polarized antenna 1502 may include a horizontally polarized antenna.

In other aspects, polarized antenna 1502 may include any other type of polarized antenna.

In some demonstrative aspects, as shown in FIG. 15, polarized antenna 1502 may include an antenna feeding trace 1520.

In some demonstrative aspects, as shown in FIG. 15, antenna feeding trace 1520 may be configured to feed antenna elements of the polarized antenna 1502.

In some demonstrative aspects, as shown in FIG. 15, antenna feeding trace 1520 may be connected to a first end of an antenna via 1532.

In some demonstrative aspects, as shown in FIG. 15, polarized antenna 1502 may include a plurality of antenna elements 1541, e.g., as described below.

In some demonstrative aspects, as shown in FIG. 15, the plurality of antenna elements 1541 may include a plurality of first antenna elements 1544.

In some demonstrative aspects, as shown in FIG. 15, the plurality of antenna elements 1541 may include a plurality of second antenna elements 1546.

In some demonstrative aspects, as shown in FIG. 15, the plurality of antenna elements 1541 may include a third antenna element 1542.

In some demonstrative aspects, as shown in FIG. 15, the third antenna element 1542 may be connected to a second end of the antenna via 1532.

In some demonstrative aspects, as shown in FIG. 15, a count of first antenna elements 1544 in the plurality of first antenna elements 1544 may not be equal to a count of second antenna elements in the plurality of second antenna elements 1546.

In some demonstrative aspects, as shown in FIG. 15, the plurality of first antenna elements 1544 may include three antenna elements 1544, and/or the plurality of second antenna elements 1546 may include two antenna elements 1546.

In other aspects, the plurality of first antenna elements 1544 and/or the plurality of second antenna elements 1546 may include any other count of antenna elements.

In some demonstrative aspects, as shown in FIG. 15, polarized antenna 1502 may include six antenna elements, for example, including the three antenna elements 1544, the two antenna elements 1546, and the antenna element 1542, e.g., 3+2+1=6.

In other aspects, polarized antenna 1502 may include any other number of antenna elements, for example, based on gain, FoV requirements, and/or any other requirements and/or criteria.

In some demonstrative aspects, as shown in FIG. 15, polarized antenna 1502 may include a plurality of antenna traces 1521.

In some demonstrative aspects, as shown in FIG. 15, the plurality of antenna traces 1521 may include a plurality of first antenna traces 1524.

In some demonstrative aspects, as shown in FIG. 15, the plurality of antenna traces 1521 may include a plurality of second antenna traces 1526.

In some demonstrative aspects, as shown in FIG. 15, the plurality of first antenna traces 1524 may be on a first side 1564 of an axis 1561 via the plurality of antenna elements 1541.

In some demonstrative aspects, as shown in FIG. 15, the plurality of second antenna traces 1526 may be on a second side 1566 of the axis 1561 via the plurality of antenna elements 1541.

In some demonstrative aspects, as shown in FIG. 15, the plurality of first antenna traces 1524 may serially connect a side of the plurality of first antenna elements 1544, which may be on the first side 1564 of the axis 1561, to a first side of the third antenna element 1542, which may be on the first side 1564 of the axis 1561.

In some demonstrative aspects, as shown in FIG. 15, the plurality of second antenna traces 1526 may serially connect a side of the plurality of second antenna elements 1546, which may be on the second side 1566 of the axis 1561, to a second side of the third antenna element 1542, which may be on the second side 1566 of the axis 1561.

In some demonstrative aspects, as shown in FIG. 15, a pair of first antenna traces 1524 of the plurality of first antenna traces 1524 may be connected to a center portion 1543 of a side of the first antenna element 1544, which may be on the first side 1564 of the axis 1561.

In some demonstrative aspects, as shown in FIG. 15, a pair of second antenna traces 1526 of the plurality of second antenna traces 1526 may be connected to a center portion 1545 of a side of the second antenna element 1546, which may be on the second side 1566 of the axis 1561.

In some demonstrative aspects, as shown in FIG. 15, polarized antenna 1502 may be configured to provide a technical solution to support an increased number of antenna elements, e.g., six antenna elements, for example, with substantially no enlargement of a width of the polarized antenna 1502, for example, compared to a width of polarized antenna 1302 (FIG. 13), which includes three antenna elements.

Referring back to FIG. 12, in some demonstrative aspects, at least one antenna element of the plurality of antenna elements 1241 may include a stacked patch antenna, e.g., as described below.

In some demonstrative aspects, the stacked patch antenna may include a first antenna patch, and at least one second antenna patch coupled to the first antenna patch, e.g., as described below.

In some demonstrative aspects, the stacked patch antenna may be implemented, for example, to provide a technical solution to support an improved, e.g., an increased, frequency bandwidth.

Figure 16:
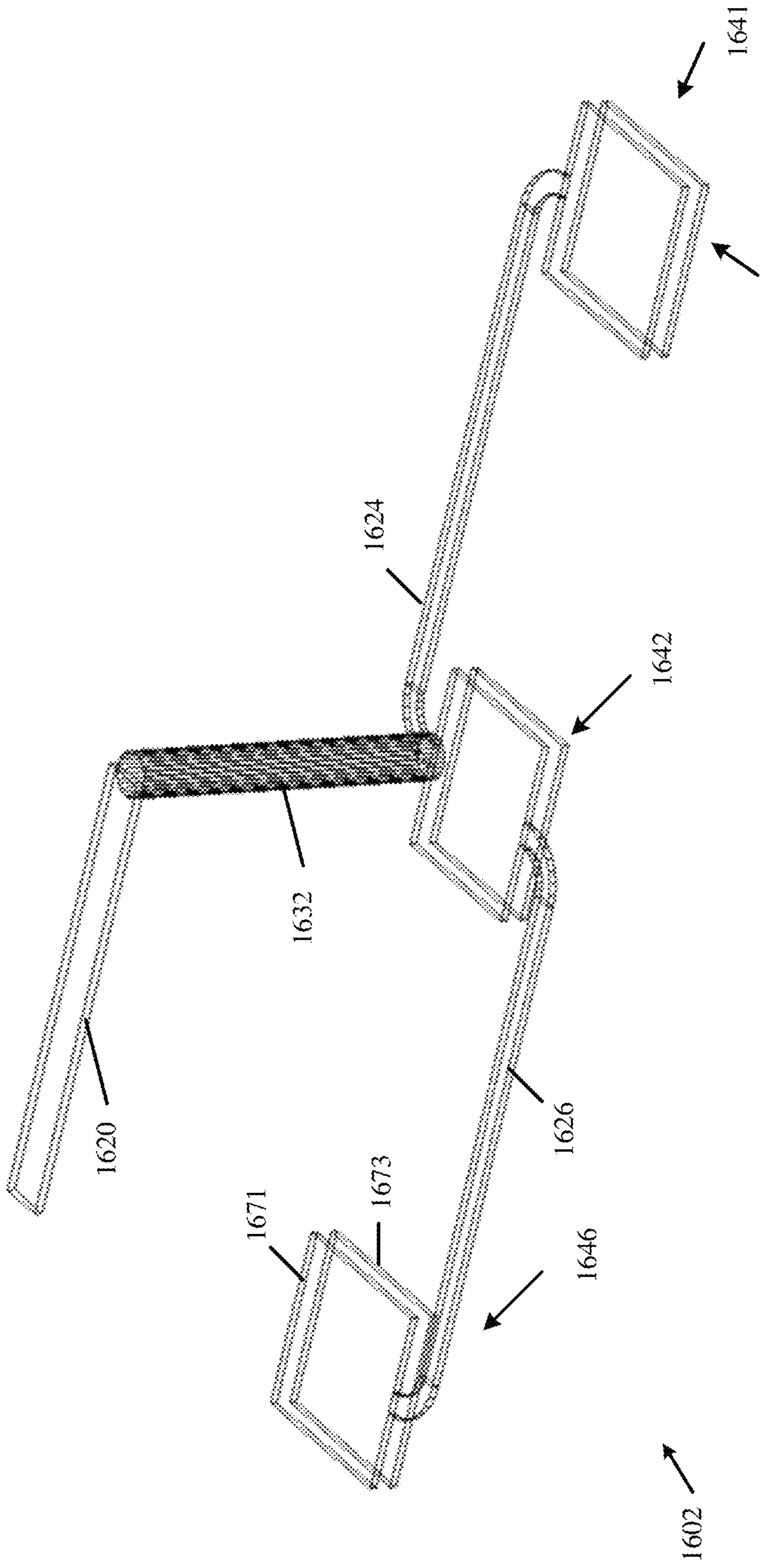
FIG. 16 is a schematic illustration of elements of a polarized antenna, in accordance with some demonstrative aspects.

Reference is made to FIG. 16, which schematically illustrates elements of a polarized antenna 1602, in accordance with some demonstrative aspects. For example, polarized antenna 1202 (FIG. 12) may include one or more elements of polarized antenna 1602, and/or may perform the functionally of polarized antenna 1602.

In one example, FIG. 1602 illustrates a 3D isometric view of elements of the polarized antenna 1602.

In some demonstrative aspects, as shown in FIG. 16, polarized antenna 1602 may include a plurality of antenna elements 1641, for example, including a first antenna element 1644, a second antenna element 1646, and/or a third antenna element 1642.

In other aspects, the plurality of antenna elements 1641 may include any other count of antenna elements.

In some demonstrative aspects, as shown in FIG. 16, polarized antenna 1602 may include an antenna feeding trace 1620.

In some demonstrative aspects, as shown in FIG. 16, antenna feeding trace 1620 may be connected to a first end of an antenna via 1632.

In some demonstrative aspects, as shown in FIG. 16, the third antenna element 1642 may be connected to a second end of the antenna via 1632.

In some demonstrative aspects, as shown in FIG. 16, a first antenna trace 1624 may connect a first side of the third antenna element 1642 to the first antenna element 1644.

In some demonstrative aspects, as shown in FIG. 16, a second antenna trace 1626 may connect a second side of the third antenna element 1642 to the second antenna element 1646.

In some demonstrative aspects, as shown in FIG. 16, antenna element 1642 may include a stacked patch antenna, antenna element 1644 may include a stacked patch antenna, and/or antenna element 1646 may include a stacked patch antenna, e.g., as described below.

In some demonstrative aspects, a stacked patch antenna may include a first antenna patch, and at least one second antenna patch, e.g., as described below.

In some demonstrative aspects, the first antenna patch may be connected to at least one trace, e.g., as described below.

In some demonstrative aspects, the second antenna patch may be coupled to the first antenna patch, e.g., as described below.

For example, as shown in FIG. 16, antenna element 1646 may be configured according to a stacked patch configuration. For example, antenna element 1642 may include a plurality of antenna patches in a stacked patch structure.

For example, as shown in FIG. 16, antenna element 1646 may include a first antenna patch 1671, which may be connected to the antenna trace 1626.

For example, as shown in FIG. 16, antenna element 1646 may include at least one second antenna patch 1673, which may be coupled to the first antenna patch 1671.

For example, as shown in FIG. 16, the at least one second antenna patch 1673 may be stacked under or over, e.g., directly under or over, the first antenna patch 1671. For example, the at least one second antenna patch 1673 may include at least one floating patch, which may be electromagnetically coupled to the first antenna patch 1671.

In some demonstrative aspects, an antenna element, e.g., antenna element 1642, antenna element 1644, and/or antenna element 1646, may be implemented according to a stacked patch configuration including two antenna patches, e.g., including a first antenna patch connected to an antenna trace, and a second, e.g., floating, antenna patch coupled to the first antenna patch, e.g., as described above.

In other aspects, an antenna element, e.g., antenna element 1642, antenna element 1644, and/or antenna element 1646, may be implemented according to a stacked patch configuration including more than two antenna patches, e.g., including a first antenna patch connected to an antenna trace, and a two or more second, e.g., floating, antenna patches coupled to the first antenna patch.

Figure 17:
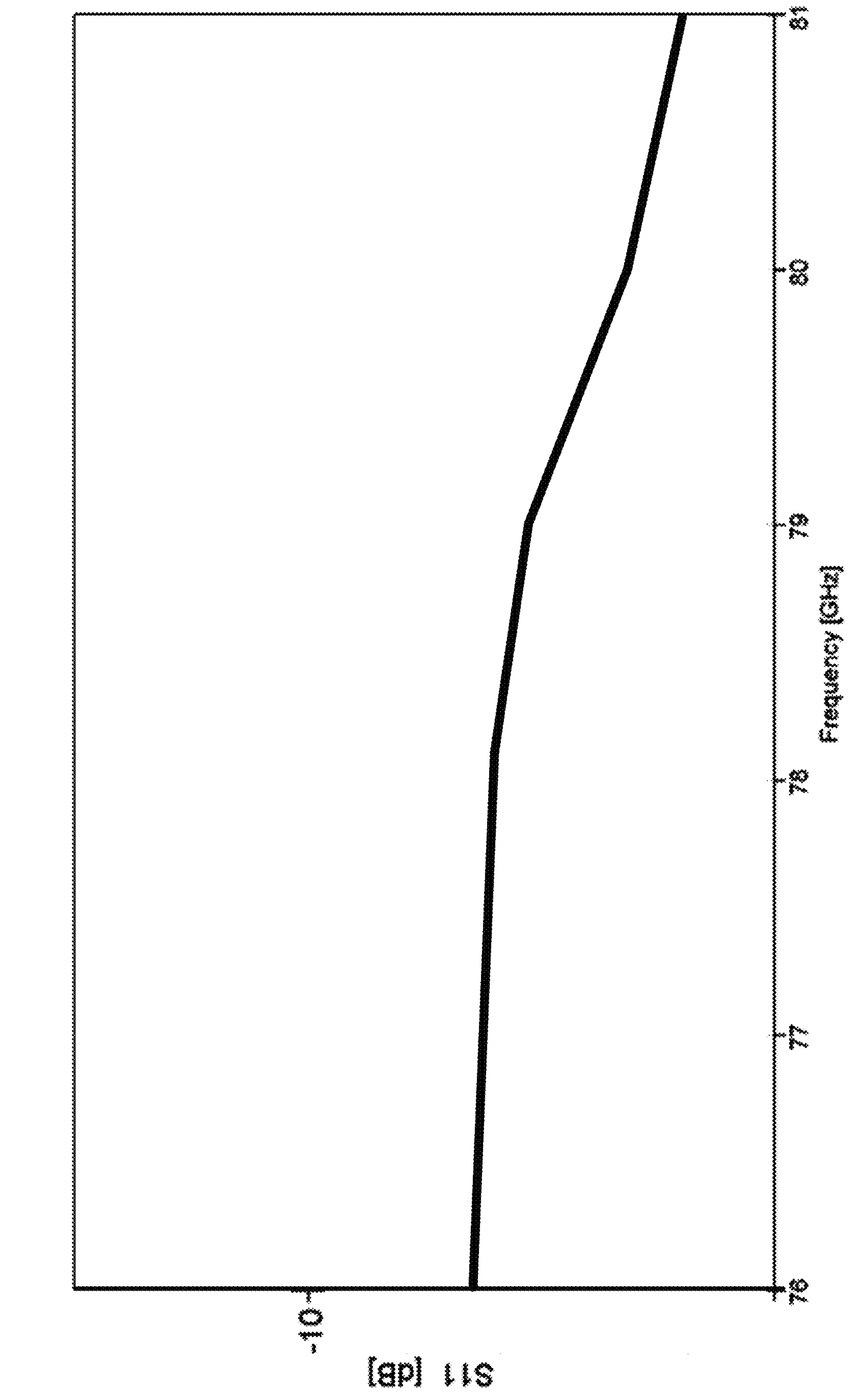
FIG. 17 is a schematic illustration of a graph depicting an antenna matching curve of a polarized antenna, in accordance with some demonstrative aspects.

Reference is made to FIG. 17, which schematically illustrates a graph 1700 depicting an antenna matching curve of a polarized antenna, in accordance with some demonstrative aspects.

In one example, the graph 1700 depicts an antenna matching curve (S11) of polarized antenna 1202 (FIG. 12), or polarized antenna 1302 (FIG. 13).

In some demonstrative aspects, as shown in FIG. 17, the polarized antenna may be configured to provide an antenna matching, which may be maintained relatively low, e.g., below −10 dBm, for example, for substantially any RF signal in a frequency bandwidth of 76-81 GHz.

In one example, a plurality of antenna traces, e.g., the plurality of antenna traces 1221 (FIG. 12), may be configured, for example, such that the antenna matching of a polarized antenna, e.g., the polarized antenna 1202 (FIG. 12), may not be greater than −10 dBm, for example, for substantially any RF signal in a frequency bandwidth of 76-81 GHz.

Figure 18:
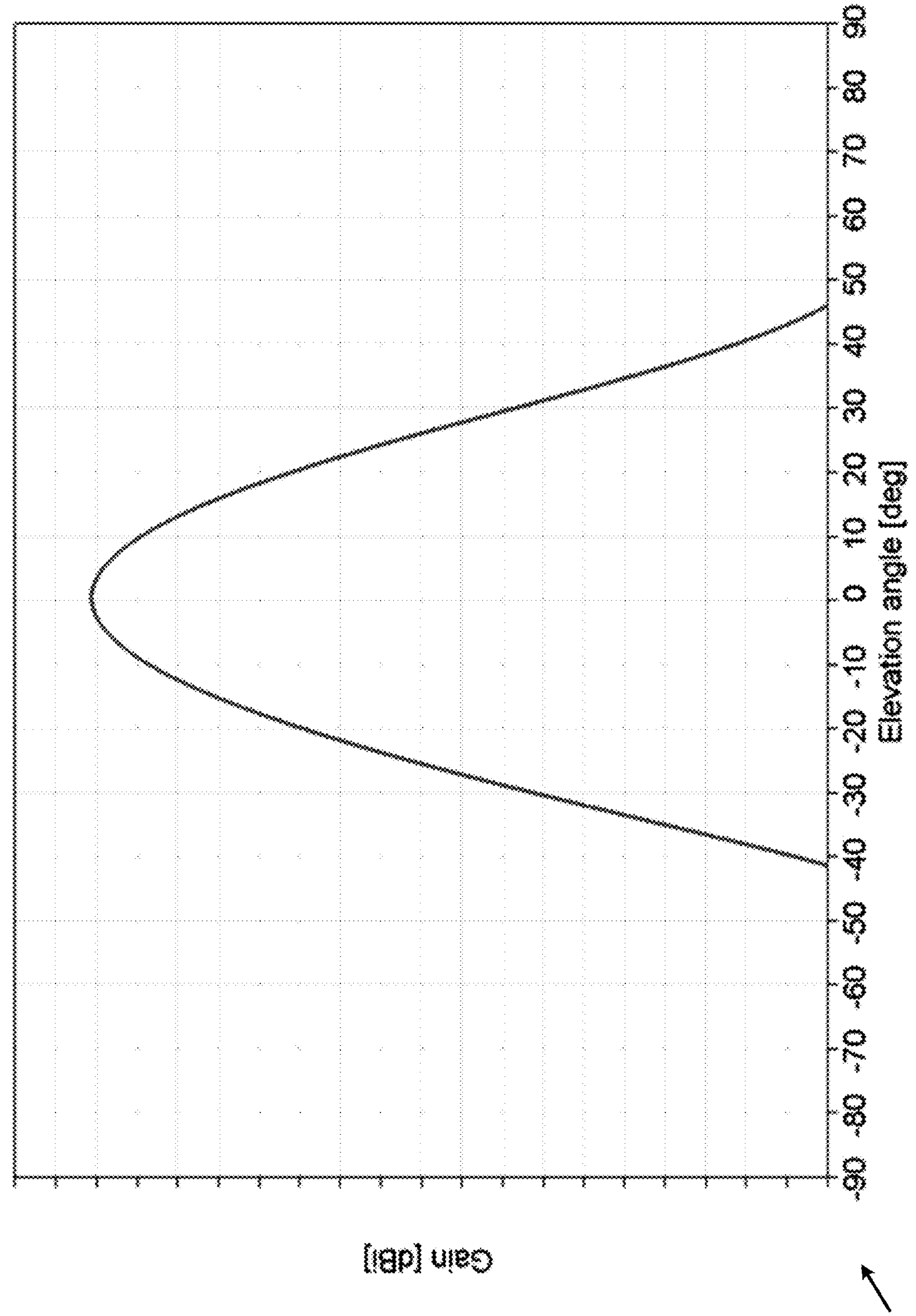
FIG. 18 is a schematic illustration of a graph depicting an antenna elevation pattern of a polarized antenna, in accordance with some demonstrative aspects.

Reference is made to FIG. 18, which schematically illustrates a graph 1800 depicting a normalized antenna elevation pattern of a polarized antenna, in accordance with some demonstrative aspects.

In one example, graph 1800 depicts the normalized elevation pattern of polarized antenna 1202 (FIG. 12) or polarized antenna 1302 (FIG. 13), for example, at a frequency of 77 GHz. For example, the elevation pattern may relate to elevation angles relative to a plane substantially parallel to the ground, e.g., a road plane.

In some demonstrative aspects, as shown in FIG. 18, the polarized antenna may provide a high gain, for example, at the frequency of 77 GHz.

In some demonstrative aspects, as shown in FIG. 18, the polarized antenna may provide a high gain at a wide beamwidth, e.g., a beamwidth of 30 degrees (°).

Figure 19:
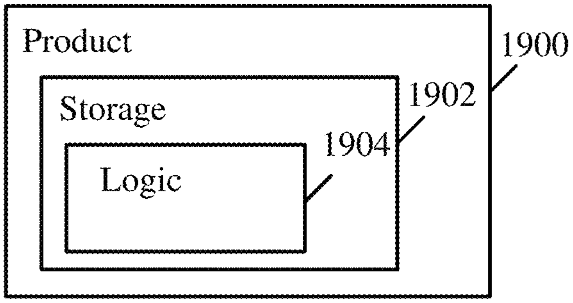
FIG. 19 is a schematic illustration of a product of manufacture, in accordance with some demonstrative aspects.

Reference is made to FIG. 19, which schematically illustrates a product of manufacture 1900, in accordance with some demonstrative aspects. Product 1900 may include one or more tangible computer-readable ("machine-readable") non-transitory storage media 1902, which may include computer-executable instructions, e.g., implemented by logic 1904, operable to, when executed by at least one computer processor, enable the at least one computer processor to implement one or more operations and/or functionalities described with reference to any of the FIGS. 1-18, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 1900 and/or machine-readable storage media 1902 may include one or more types of computer-readable storage media capable of storing data, including volatile memory, non-volatile memory, removable or non-removable memory, erasable or non-erasable memory, writeable or re-writeable memory, and the like. For example, machine-readable storage media 1902 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), flash memory (e.g., NOR or NAND flash memory), content addressable memory (CAM), polymer memory, phase-change memory, ferroelectric memory, silicon-oxide-nitride-oxide-silicon (SONOS) memory, a disk, a hard drive, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 1904 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 1904 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, machine code, and the like.

EXAMPLES

The following examples pertain to further aspects.

Example 1 includes an apparatus comprising a polarized antenna comprising a dielectric layer comprising an antenna via; a first metal layer on a first side of the dielectric layer, the first metal layer comprising an antenna feeding trace connected to a first end of the antenna via; and a second metal layer on a second side of the dielectric layer opposite to the first side of the dielectric layer, the second metal layer comprising a plurality of antenna elements comprising a first antenna element, a second antenna element, and a third antenna element, wherein the third antenna element is connected to a second end of the antenna via; and a plurality of antenna traces serially connecting the plurality of antenna elements, the plurality of antenna traces comprising a first antenna trace and a second antenna trace, wherein the first antenna trace connects the first antenna element to a first side of the third antenna element on a first side of an axis via the plurality of antenna elements, wherein the second antenna trace connects the second antenna element to a second side of the third antenna element on a second side of the axis.

Example 2 includes the subject matter of Example 1, and optionally, wherein the first antenna trace connects the first side of the third antenna element to a side of the first antenna element, which is on the first side of the axis.

Example 3 includes the subject matter of Example 1 or 2, and optionally, wherein the second antenna trace connects the second side of the third antenna element to a side of the second antenna element, which is on the second side of the axis.

Example 4 includes the subject matter of any one of Examples 1-3, and optionally, wherein an end of the first antenna trace is connected to a center portion of the first side of the third antenna element, wherein an end of the second antenna trace is connected to a center portion of the second side of the third antenna element.

Example 5 includes the subject matter of Example 4, and optionally, wherein the second end of the antenna via is connected to one of the center portion of the first side of the third antenna element or the center portion of the second side of the third antenna element.

Example 6 includes the subject matter of any one of Examples 1-5, and optionally, wherein the antenna via is directly above one of a center portion of the first side of the third antenna element or a center portion of the second side of the third antenna element.

Example 7 includes the subject matter of any one of Examples 1-6, and optionally, wherein the first antenna trace is on the first side of the axis, and the second antenna trace is on the second side of the axis.

Example 8 includes the subject matter of any one of Examples 1-7, and optionally, wherein the plurality of antenna elements comprises a plurality of first antenna elements comprising the first antenna element, wherein the plurality of antenna traces comprises a plurality of first antenna traces comprising the first antenna trace, wherein the plurality of first antenna traces serially connects a side of the plurality of first antenna elements, which is on the first side of the axis, to the first side of the third antenna element.

Example 9 includes the subject matter of Example 8, and optionally, wherein a pair of first antenna traces of the plurality of first antenna traces is connected to a center portion of a side of the first antenna element, which is on the first side of the axis.

Example 10 includes the subject matter of Example 8 or 9, and optionally, wherein the plurality of antenna elements comprises a plurality of second antenna elements comprising the second antenna element, wherein the plurality of antenna traces comprises a plurality of second antenna traces comprising the second antenna trace, wherein the plurality of second antenna traces serially connects a side of the plurality of second antenna elements, which is on the second side of the axis, to the second side of the third antenna element.

Example 11 includes the subject matter of Example 10, and optionally, wherein the plurality of first antenna traces is on the first side of the axis, and the plurality of second antenna traces is on the second side of the axis.

Example 12 includes the subject matter of Example 10 or 11, and optionally, wherein a count of first antenna elements in the plurality of first antenna elements is equal to a count of second antenna elements in the plurality of second antenna elements.

Example 13 includes the subject matter of Example 12, and optionally, wherein the plurality of first antenna elements comprises three antenna elements, and the plurality of second antenna elements comprises three antenna elements.

Example 14 includes the subject matter of Example 10 or 11, and optionally, wherein a count of first antenna elements in the plurality of first antenna elements is not equal to a count of second antenna elements in the plurality of second antenna elements.

Example 15 includes the subject matter of Example 14, and optionally, wherein the plurality of first antenna elements comprises three antenna elements, and the plurality of second antenna elements comprises two antenna elements.

Example 16 includes the subject matter of any one of Examples 1-15, and optionally, wherein a length of the first antenna trace is substantially equal to, or an integer multiple of, a length of the second antenna trace.

Example 17 includes the subject matter of any one of Examples 1-16, and optionally, wherein the first antenna trace and the second antenna trace are configured such that for first, second, and third signals simultaneously communicated via the first antenna element, the second antenna element, and the third antenna element, respectively, a phase of each of the first, second, and third signals is substantially equal to a particular phase, or is an integer multiple of 360 degrees from the particular phase.

Example 18 includes the subject matter of any one of Examples 1-17, and optionally, wherein the plurality of antenna traces is configured such that an antenna matching of the polarized antenna is not greater than-10 decibel milliwatts (dBm) for any Radio Frequency (RF) signal in a frequency bandwidth of 76-81 Gigahertz (GHz).

Example 19 includes the subject matter of any one of Examples 1-18, and optionally, wherein the plurality of antenna elements comprises one or more patch antenna elements.

Example 20 includes the subject matter of any one of Examples 1-19, and optionally, wherein at least one antenna element of the plurality of antenna elements comprises a stacked patch antenna, the stacked patch antenna comprising a first antenna patch, and at least one second antenna patch coupled to the first antenna patch.

Example 21 includes the subject matter of any one of Examples 1-20, and optionally, wherein the polarized antenna comprises a horizontally polarized antenna.

Example 22 includes the subject matter of any one of Examples 1-21, and optionally, wherein the polarized antenna is configured to communicate Radio Frequency (RF) signals at a frequency above 70 Gigahertz (GHz).

Example 23 includes the subject matter of any one of Examples 1-22, and optionally, wherein the polarized antenna is configured to communicate Radio Frequency (RF) signals in a frequency bandwidth of 76-81 Gigahertz (GHz).

Example 24 includes the subject matter of any one of Examples 1-23, and optionally, comprising a Radio-Frequency (RF) chain to communicate signals via the polarized antenna.

Example 25 includes the subject matter of any one of Examples 1-24, and optionally, comprising a radar device, the radar device comprising a plurality of Transmit (Tx) antennas connected to a plurality of Tx chains, a plurality of Rx antennas connected to a plurality of Rx chains, and a radar processor to generate radar information based on radar Rx signals processed by the Rx chains, wherein at least one antenna of the plurality of Tx antennas or the plurality of Rx antennas comprises the polarized antenna.

Example 26 includes the subject matter of Example 25, and optionally, comprising a vehicle, the vehicle comprising the radar device, and a system controller to control one or more systems of the vehicle based on the radar information.

Example 27 includes a device comprising the apparatus of any of Examples 1-24 and a communication interface to communicate signals via the polarized antenna.

Example 28 includes a vehicle comprising the apparatus of any of Examples 1-27.

Example 29 includes an apparatus comprising means for performing any of the described operations of any of Examples 1-27.

Example 30 includes a machine-readable medium that stores instructions for execution by a processor to perform any of the described operations of any of Examples 1-27.

Example 31 comprises a product comprising one or more tangible computer-readable non-transitory storage media comprising computer-executable instructions operable to, when executed by at least one processor, enable the at least one processor to cause a device to perform any of the described operations of any of Examples 1-27.

Example 32 includes an apparatus comprising a memory; and processing circuitry configured to perform any of the described operations of any of Examples 1-27.

Example 33 includes a method including any of the described operations of any of Examples 1-27.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:

a polarized antenna comprising:

a dielectric layer comprising an antenna via;

a first metal layer on a first side of the dielectric layer, the first metal layer comprising an antenna feeding trace connected to a first end of the antenna via; and a second metal layer on a second side of the dielectric layer opposite to the first side of the dielectric layer, the second metal layer comprising:

a plurality of antenna elements comprising a first antenna element, a second antenna element, and a third antenna element, wherein the third antenna element is connected to a second end of the antenna via; and a plurality of antenna traces serially connecting the plurality of antenna elements, the plurality of antenna traces comprising a first antenna trace and a second antenna trace, wherein the first antenna trace connects the first antenna element to a first side of the third antenna element on a first side of an axis via the plurality of antenna elements, wherein the second antenna trace connects the second antenna element to a second side of the third antenna element on a second side of the axis.

2. The apparatus of claim 1, wherein the first antenna trace connects the first side of the third antenna element to a side of the first antenna element, which is on the first side of the axis.

3. The apparatus of claim 1, wherein the second antenna trace connects the second side of the third antenna element to a side of the second antenna element, which is on the second side of the axis.

4. The apparatus of claim 1, wherein an end of the first antenna trace is connected to a center portion of the first side of the third antenna element, wherein an end of the second antenna trace is connected to a center portion of the second side of the third antenna element.

5. The apparatus of claim 4, wherein the second end of the antenna via is connected to one of the center portion of the first side of the third antenna element or the center portion of the second side of the third antenna element.

6. The apparatus of claim 1, wherein the antenna via is directly above one of a center portion of the first side of the third antenna element or a center portion of the second side of the third antenna element.

7. The apparatus of claim 1, wherein the first antenna trace is on the first side of the axis, and the second antenna trace is on the second side of the axis.

8. The apparatus of claim 1, wherein the plurality of antenna elements comprises a plurality of first antenna elements comprising the first antenna element, wherein the plurality of antenna traces comprises a plurality of first antenna traces comprising the first antenna trace, wherein the plurality of first antenna traces serially connects a side of the plurality of first antenna elements, which is on the first side of the axis, to the first side of the third antenna element.

9. The apparatus of claim 8, wherein a pair of first antenna traces of the plurality of first antenna traces is connected to a center portion of a side of the first antenna element, which is on the first side of the axis.

10. The apparatus of claim 8, wherein the plurality of antenna elements comprises a plurality of second antenna elements comprising the second antenna element, wherein the plurality of antenna traces comprises a plurality of second antenna traces comprising the second antenna trace, wherein the plurality of second antenna traces serially connects a side of the plurality of second antenna elements, which is on the second side of the axis, to the second side of the third antenna element.

11. The apparatus of claim 10, wherein the plurality of first antenna traces is on the first side of the axis, and the plurality of second antenna traces is on the second side of the axis.

12. The apparatus of claim 10, wherein a count of first antenna elements in the plurality of first antenna elements is equal to a count of second antenna elements in the plurality of second antenna elements.

13. The apparatus of claim 12, wherein the plurality of first antenna elements comprises three antenna elements, and the plurality of second antenna elements comprises three antenna elements.

14. The apparatus of claim 10, wherein a count of first antenna elements in the plurality of first antenna elements is not equal to a count of second antenna elements in the plurality of second antenna elements.

15. The apparatus of claim 1, wherein a length of the first antenna trace is substantially equal to, or an integer multiple of, a length of the second antenna trace.

16. The apparatus of claim 1, wherein the first antenna trace and the second antenna trace are configured such that for first, second, and third signals simultaneously communicated via the first antenna element, the second antenna element, and the third antenna element, respectively, a phase of each of the first, second, and third signals is substantially equal to a particular phase, or is an integer multiple of 360 degrees from the particular phase.

17. The apparatus of claim 1, wherein the plurality of antenna traces is configured such that an antenna matching of the polarized antenna is not greater than-10 decibel milliwatts (dBm) for any Radio Frequency (RF) signal in a frequency bandwidth of 76-81 Gigahertz (GHz).

18. The apparatus of claim 1, wherein the plurality of antenna elements comprises one or more patch antenna elements.

19. The apparatus of claim 1, wherein at least one antenna element of the plurality of antenna elements comprises a stacked patch antenna, the stacked patch antenna comprising a first antenna patch, and at least one second antenna patch coupled to the first antenna patch.

20. The apparatus of claim 1, wherein the polarized antenna comprises a horizontally polarized antenna.

21. The apparatus of claim 1, wherein the polarized antenna is configured to communicate Radio Frequency (RF) signals at a frequency above 70 Gigahertz (GHz).

22. A radar system comprising:

one or more Transmit (Tx) antennas;

one or more Receive (Rx) antennas; and a radar processor to generate radar information based on radar Rx signals received by the one or more Rx antennas, the radar Rx signals based on radar Tx signals transmitted by the one or more Tx antennas, wherein at least one antenna of the one or more Tx antennas or the one or more Rx antennas comprises a polarized antenna, the polarized antenna comprising:

a dielectric layer comprising an antenna via;

a first metal layer on a first side of the dielectric layer, the first metal layer comprising an antenna feeding trace connected to a first end of the antenna via; and a second metal layer on a second side of the dielectric layer opposite to the first side of the dielectric layer, the second metal layer comprising:

a plurality of antenna elements comprising a first antenna element, a second antenna element, and a third antenna element, wherein the third antenna element is connected to a second end of the antenna via; and a plurality of antenna traces serially connecting the plurality of antenna elements, the plurality of antenna traces comprising a first antenna trace and a second antenna trace, wherein the first antenna trace connects the first antenna element to a first side of the third antenna element on a first side of an axis via the plurality of antenna elements, wherein the second antenna trace connects the second antenna element to a second side of the third antenna element on a second side of the axis.

23. The radar system of claim 22, wherein the first antenna trace connects the first side of the third antenna element to a side of the first antenna element, which is on the first side of the axis.

24. A vehicle comprising:

a system controller configured to control one or more vehicular systems of the vehicle based on radar information; and a radar system configured to provide the radar information to the system controller, the radar system comprising:

one or more Transmit (Tx) antennas;

one or more Receive (Rx) antennas; and a radar processor to generate the radar information based on radar Rx signals received by the one or more Rx antennas, the radar Rx signals based on radar Tx signals transmitted by the one or more Tx antennas, wherein at least one antenna of the one or more Tx antennas or the one or more Rx antennas comprises a polarized antenna, the polarized antenna comprising:

a dielectric layer comprising an antenna via;

a first metal layer on a first side of the dielectric layer, the first metal layer comprising an antenna feeding trace connected to a first end of the antenna via; and a second metal layer on a second side of the dielectric layer opposite to the first side of the dielectric layer, the second metal layer comprising:

a plurality of antenna elements comprising a first antenna element, a second antenna element, and a third antenna element, wherein the third antenna element is connected to a second end of the antenna via; and a plurality of antenna traces serially connecting the plurality of antenna elements, the plurality of antenna traces comprising a first antenna trace and a second antenna trace, wherein the first antenna trace connects the first antenna element to a first side of the third antenna element on a first side of an axis via the plurality of antenna elements, wherein the second antenna trace connects the second antenna element to a second side of the third antenna element on a second side of the axis.

25. The vehicle of claim 24, wherein an end of the first antenna trace is connected to a center portion of the first side of the third antenna element, wherein an end of the second antenna trace is connected to a center portion of the second side of the third antenna element.

* * * * *